(12) United States Patent
Moon et al.

(10) Patent No.: US 11,285,441 B2
(45) Date of Patent: Mar. 29, 2022

(54) WATER PURIFIER AND CONTROL METHOD FOR WATER PURIFIER

(71) Applicant: COWAY CO., LTD., Chungcheongnam-do (KR)

(72) Inventors: Hyoung-Min Moon, Seoul (KR); Dae-Jung Jeong, Seoul (KR); Byoung-Phil Lee, Seoul (KR); Sung-Kon Cho, Seoul (KR); Sang-Hyeon Kang, Seoul (KR); Sung-Han Yun, Seoul (KR); Ju-Hyuk Eom, Seoul (KR); Dae-Sik Kang, Seoul (KR); Jung-Hun Lee, Seoul (KR)

(73) Assignee: Coway Co., Ltd

( * ) Notice: Subject to any disclaimer, the term of this patent is extended or adjusted under 35 U.S.C. 154(b) by 502 days.

(21) Appl. No.: 16/084,116

(22) PCT Filed: Mar. 7, 2017

(86) PCT No.: PCT/KR2017/002437
§ 371 (c)(1),
(2) Date: Sep. 11, 2018

(87) PCT Pub. No.: WO2017/155274
PCT Pub. Date: Sep. 14, 2017

(65) Prior Publication Data
US 2019/0083934 A1    Mar. 21, 2019

(30) Foreign Application Priority Data

Mar. 11, 2016  (KR) .................. 10-2016-0029359
Oct. 5, 2016  (KR) .................. 10-2016-0128241

(51) Int. Cl.
*B01D 61/12*   (2006.01)
*B01D 61/02*   (2006.01)
(Continued)

(52) U.S. Cl.
CPC .......... *B01D 61/12* (2013.01); *B01D 37/043* (2013.01); *B01D 61/02* (2013.01); *B01D 61/025* (2013.01);
(Continued)

(58) Field of Classification Search
CPC ...... B01D 61/12; B01D 61/02; B01D 61/025; B01D 61/08; B01D 61/10; B01D 37/043;
(Continued)

(56) References Cited

U.S. PATENT DOCUMENTS

| 5,122,265 A | 6/1992 | Mora et al. |
| 2017/0014769 A1 | 1/2017 | Kwon et al. |

FOREIGN PATENT DOCUMENTS

| EP | 0 995 482 | 4/2000 |
| KR | 1020010097687 | 11/2001 |

(Continued)

OTHER PUBLICATIONS

WO 2014021541 English translation, Feb. 2014, Kim Kwan Yeop et al.*

(Continued)

*Primary Examiner* — Akash K Varma
(74) *Attorney, Agent, or Firm* — The Farrell Law Firm, P.C.

(57) ABSTRACT

According to one embodiment of the present invention, a control method for a water purifier comprises the steps of: filtering inflowing water so as to generate purified water; extracting the generated purified water; measuring the flow rate of the purified water extracted per unit time; flushing a filter part by using purified water generated in the filter part, when the extraction of the purified water is complete; and draining the flushed water to the outside through a residential water outlet of the filter part, wherein, in the purified water generation step, discharging of residential water gen- (Continued)

erated in the purified water generation step is blocked according to the accumulated flow rate during a one-time extraction of the purified water, calculated on the basis of the flow rate of the purified water.

9 Claims, 20 Drawing Sheets

(51) Int. Cl.
  *B01D 65/02* (2006.01)
  *C02F 1/00* (2006.01)
  *C02F 1/44* (2006.01)
  *B01D 61/08* (2006.01)
  *B01D 61/10* (2006.01)
  *B01D 37/04* (2006.01)

(52) U.S. Cl.
  CPC ............ *B01D 61/08* (2013.01); *B01D 61/10* (2013.01); *B01D 65/02* (2013.01); *C02F 1/00* (2013.01); *C02F 1/008* (2013.01); *C02F 1/441* (2013.01); *B01D 2313/18* (2013.01); *B01D 2313/243* (2013.01); *B01D 2313/90* (2013.01); *B01D 2315/00* (2013.01); *B01D 2321/02* (2013.01); *B01D 2321/04* (2013.01); *C02F 2209/40* (2013.01)

(58) Field of Classification Search
  CPC ........ B01D 37/04; B01D 35/14; B01D 35/16; B01D 35/147; B01D 35/157; B01D 35/06; B01D 35/30; B01D 65/02; B01D 2313/18; B01D 2313/243; B01D 2313/90; B01D 2315/00; B01D 2321/02; B01D 2321/04; C02F 1/00; C02F 1/008; C02F 1/441; C02F 1/44; C02F 1/48; C02F 2209/40; C02F 2303/14
  USPC .......................................................... 210/109
  See application file for complete search history.

(56) References Cited

FOREIGN PATENT DOCUMENTS

| | | | | |
|---|---|---|---|---|
| KR | 1020060005612 | | 1/2006 | |
| KR | 1020090095052 | | 9/2009 | |
| KR | 20140081629 | A * | 7/2014 | ............ B01D 35/22 |
| KR | 1020140081629 | | 7/2014 | |
| WO | WO 2008/105580 | | 9/2008 | |
| WO | WO 2014/021541 | | 2/2014 | |
| WO | WO 2014021541 | * | 2/2014 | ............ B01D 61/00 |
| WO | WO 2015/126107 | | 8/2015 | |

OTHER PUBLICATIONS

KR 20140081629A English description translation, Jul. 2014, OH Hyang Kyun et al.*
European Search Report dated Feb. 28, 2019 issued in counterpart application No. 17763535.6-1104, 7 pages.
PCT/ISA/210 Search Report issued on PCT/KR2017/002437 pp. 5.
PCT/ISA/237 Written Opinion issued on PCT/KR2017/002437 pp. 20.

* cited by examiner

[FIG. 1]
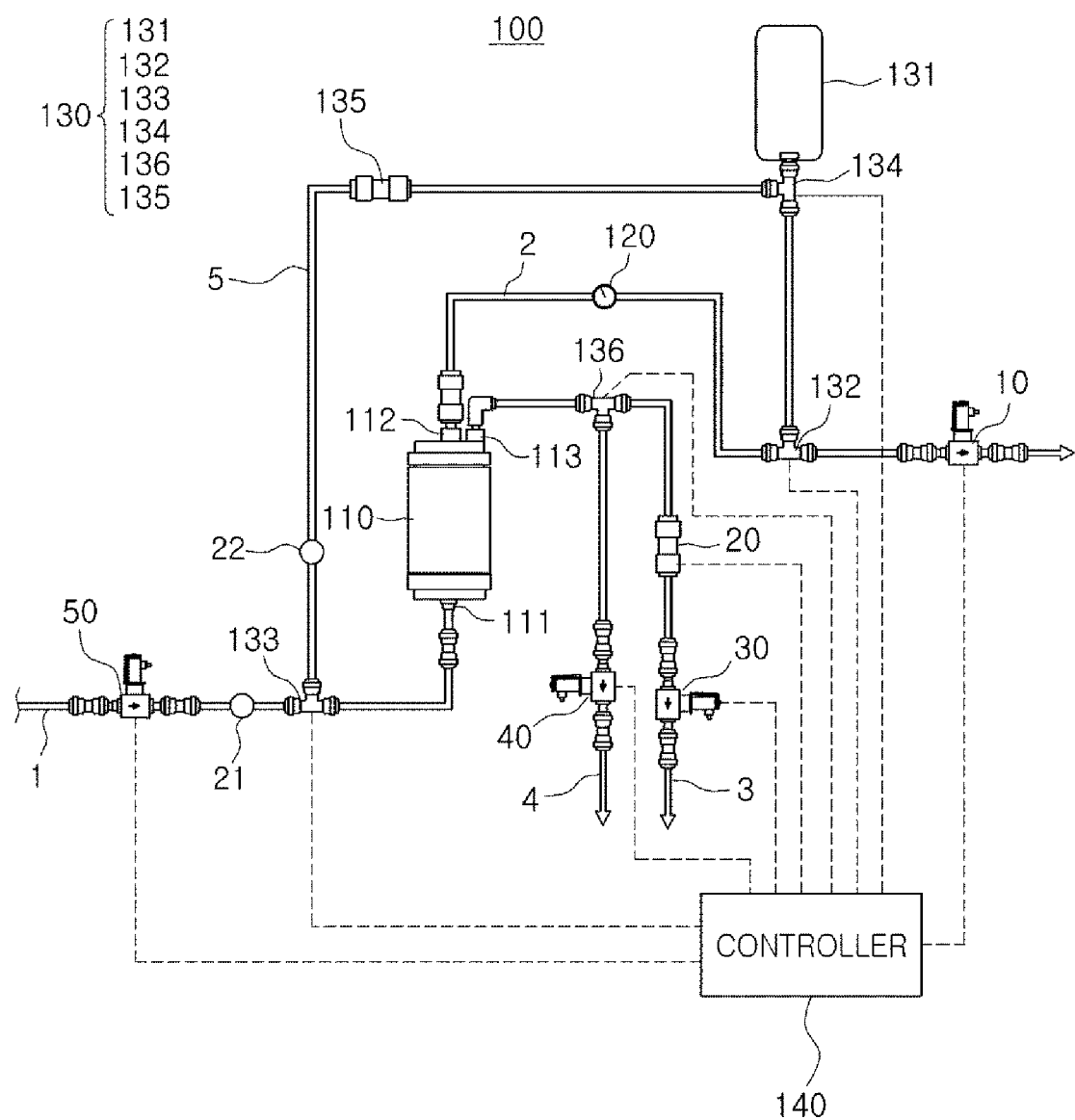

[FIG. 2]
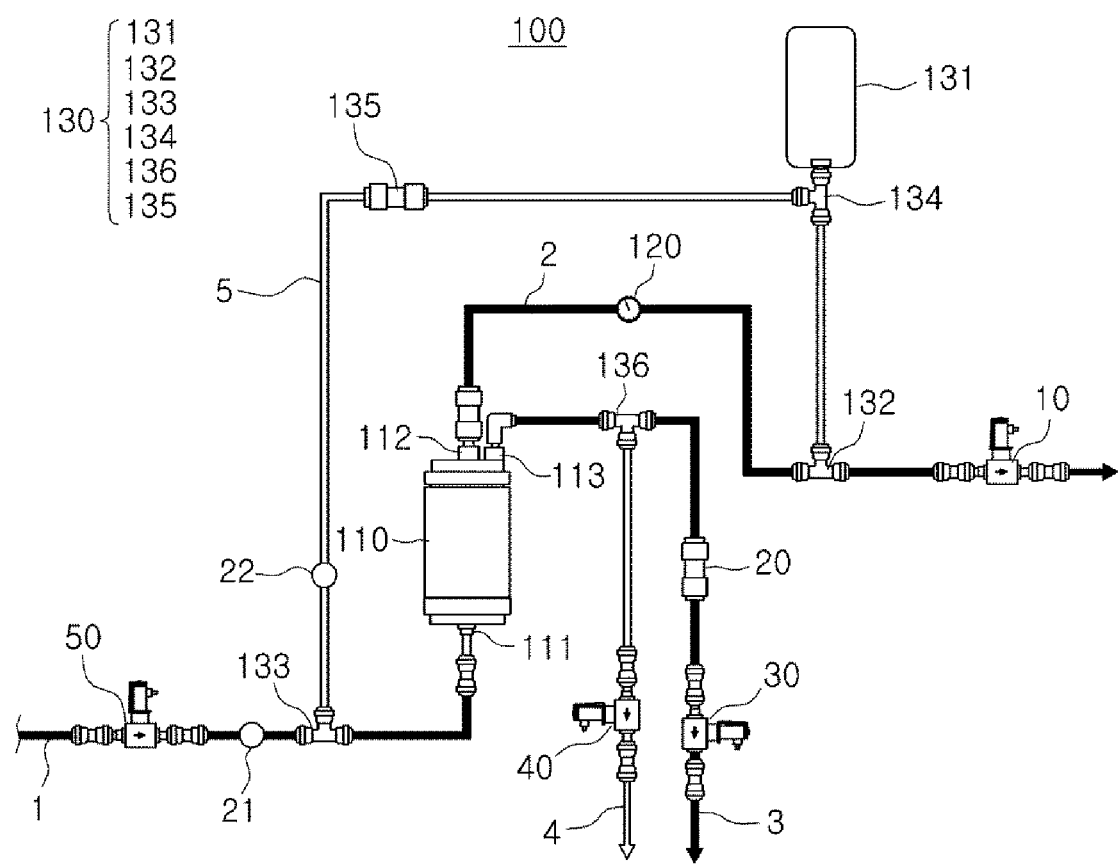

[FIG. 3]
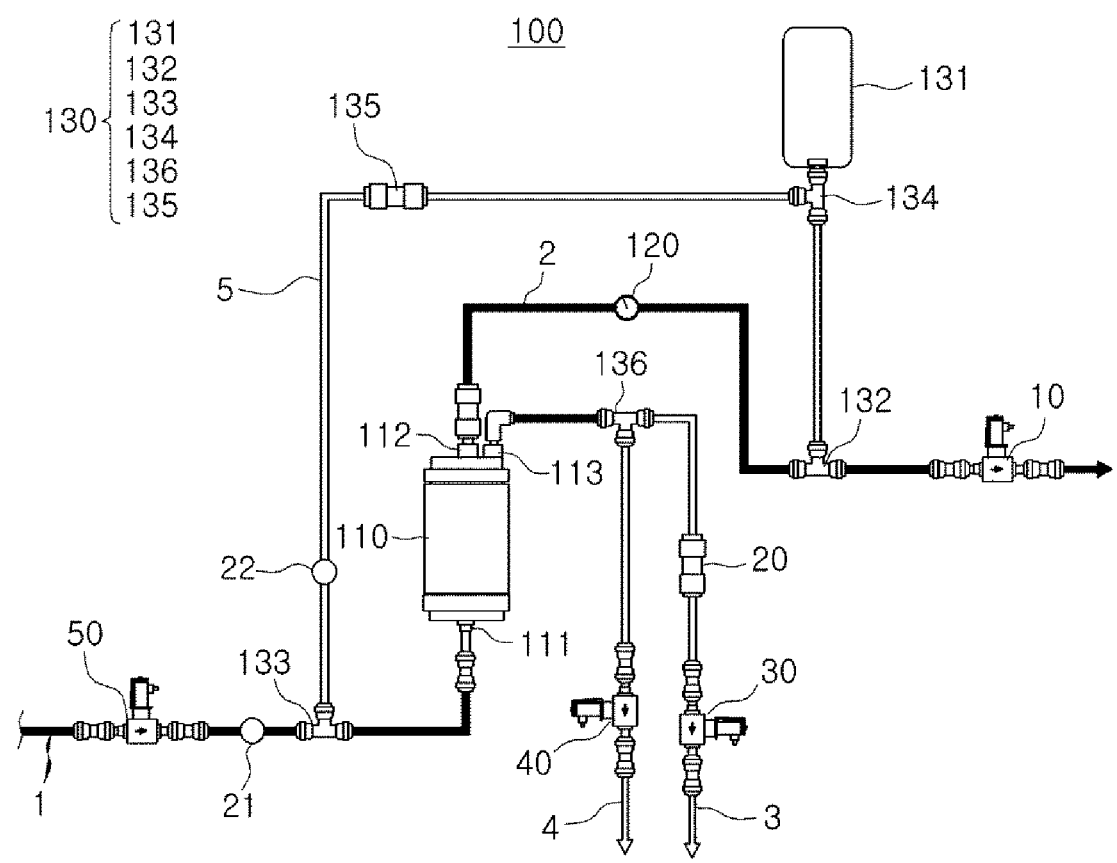

[FIG. 4]
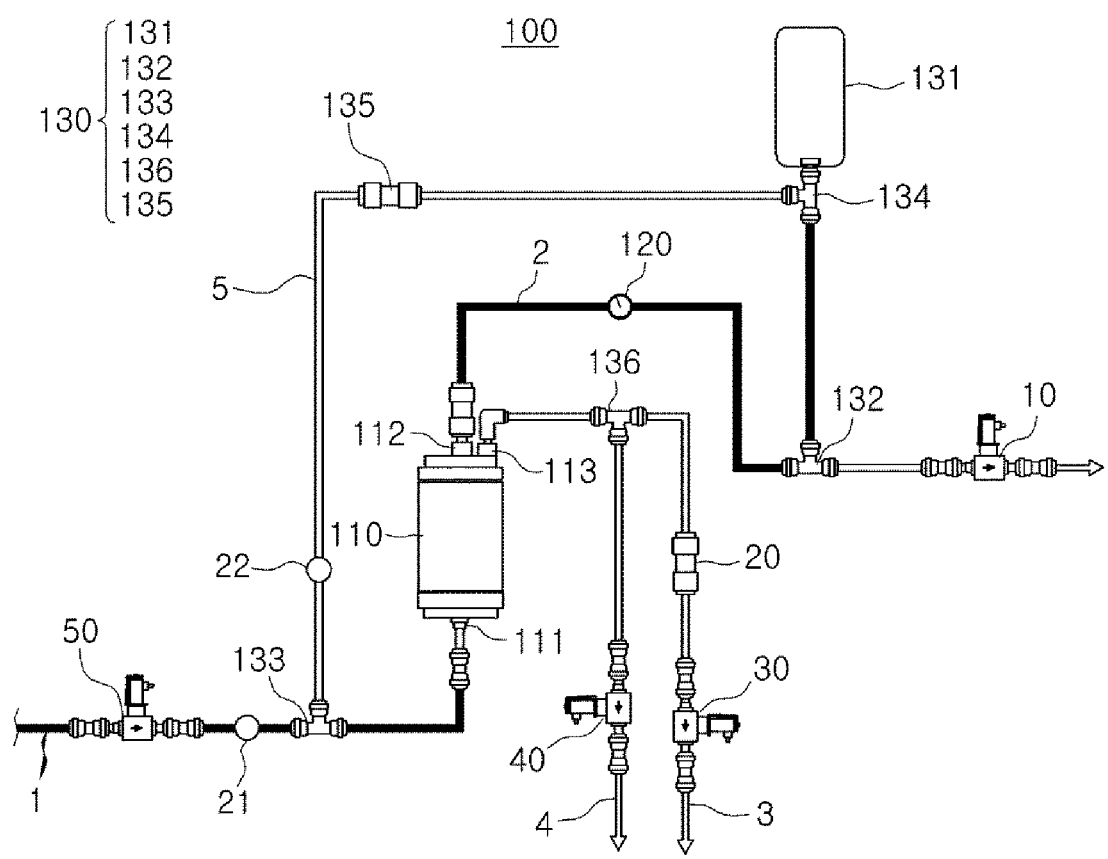

[FIG. 5]
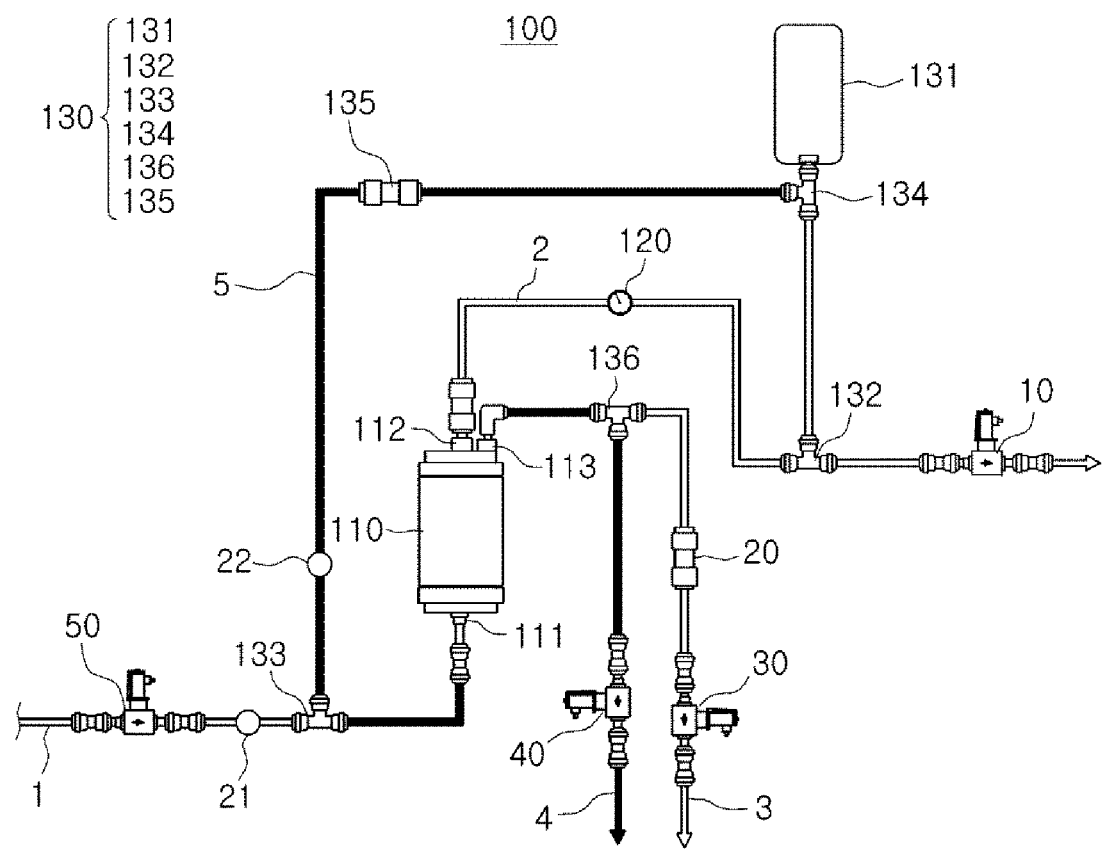

[FIG. 6]
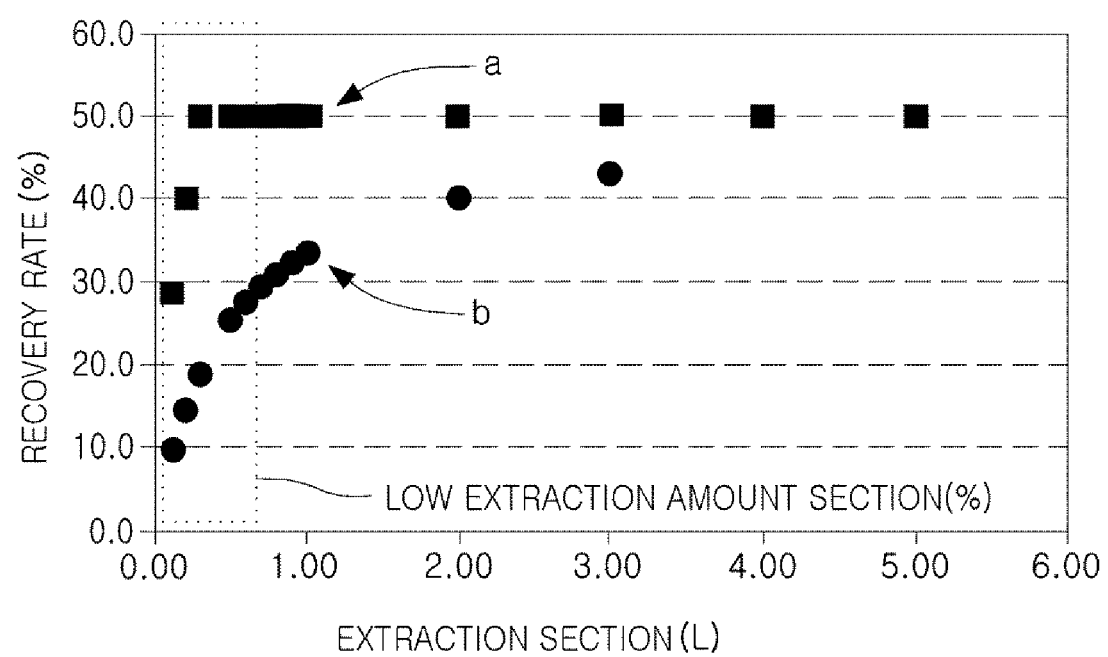

[FIG. 7]
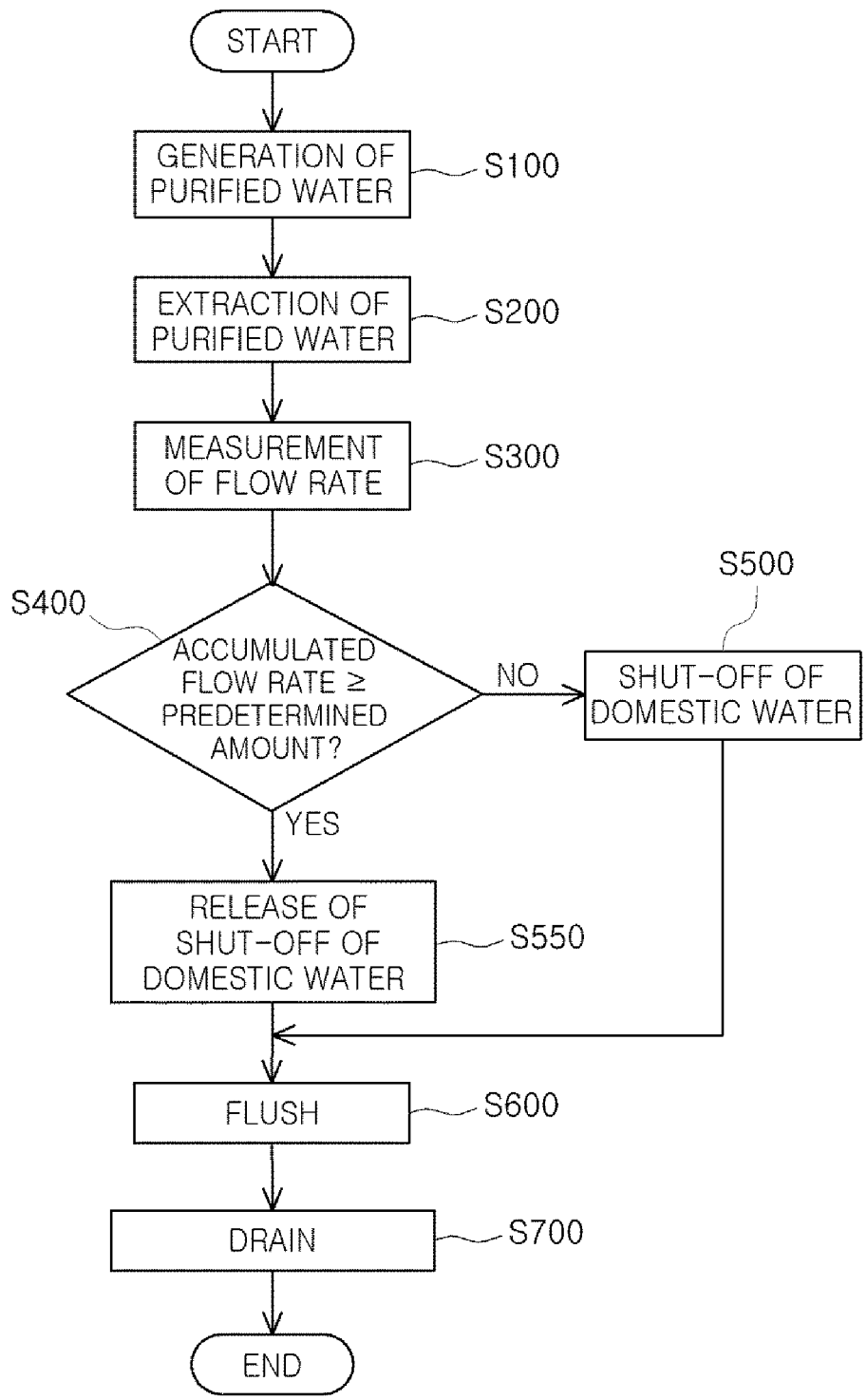

[FIG. 8]
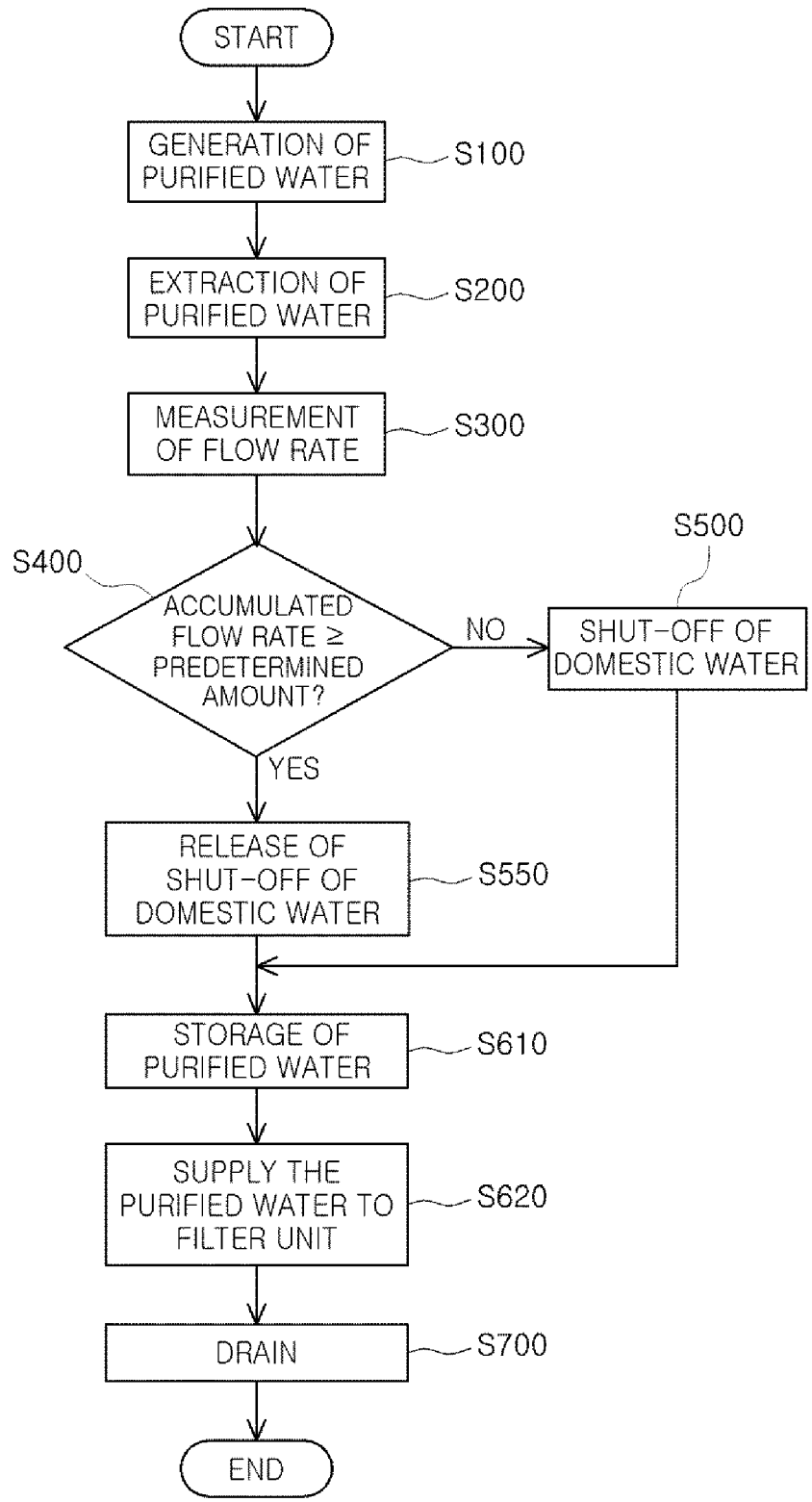

[FIG. 9]
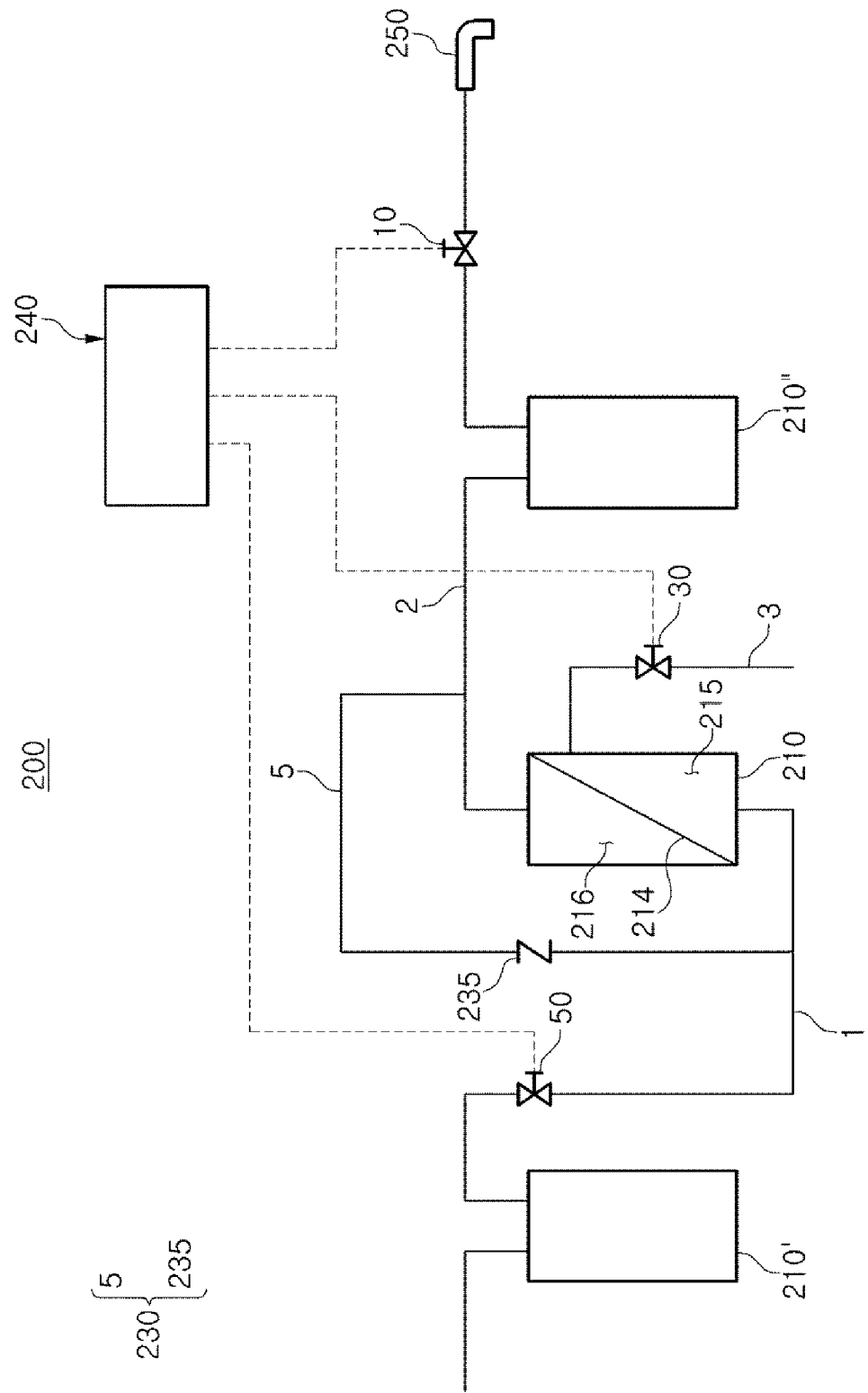

【FIG. 10】
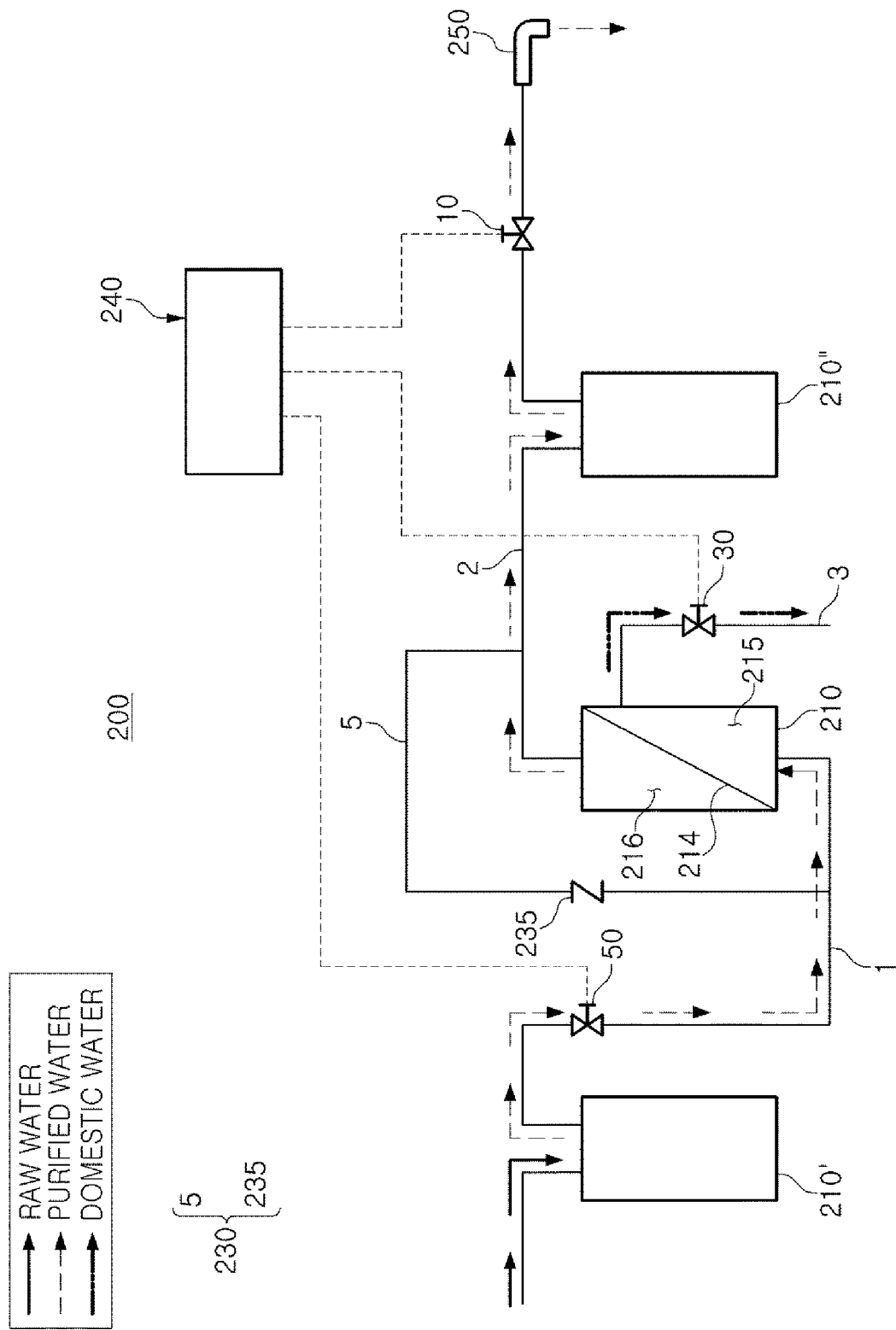

[FIG. 11]
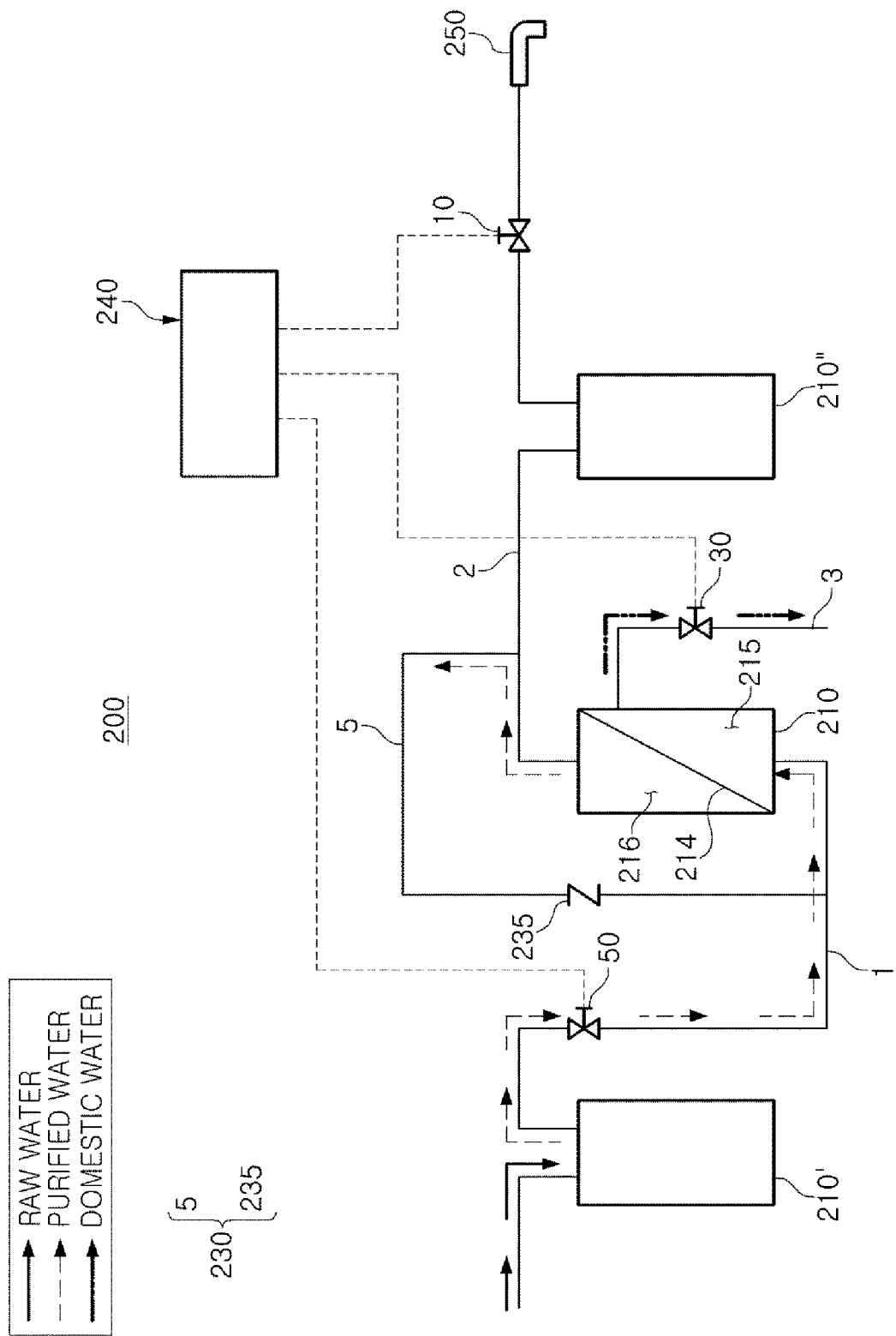

[FIG. 12]
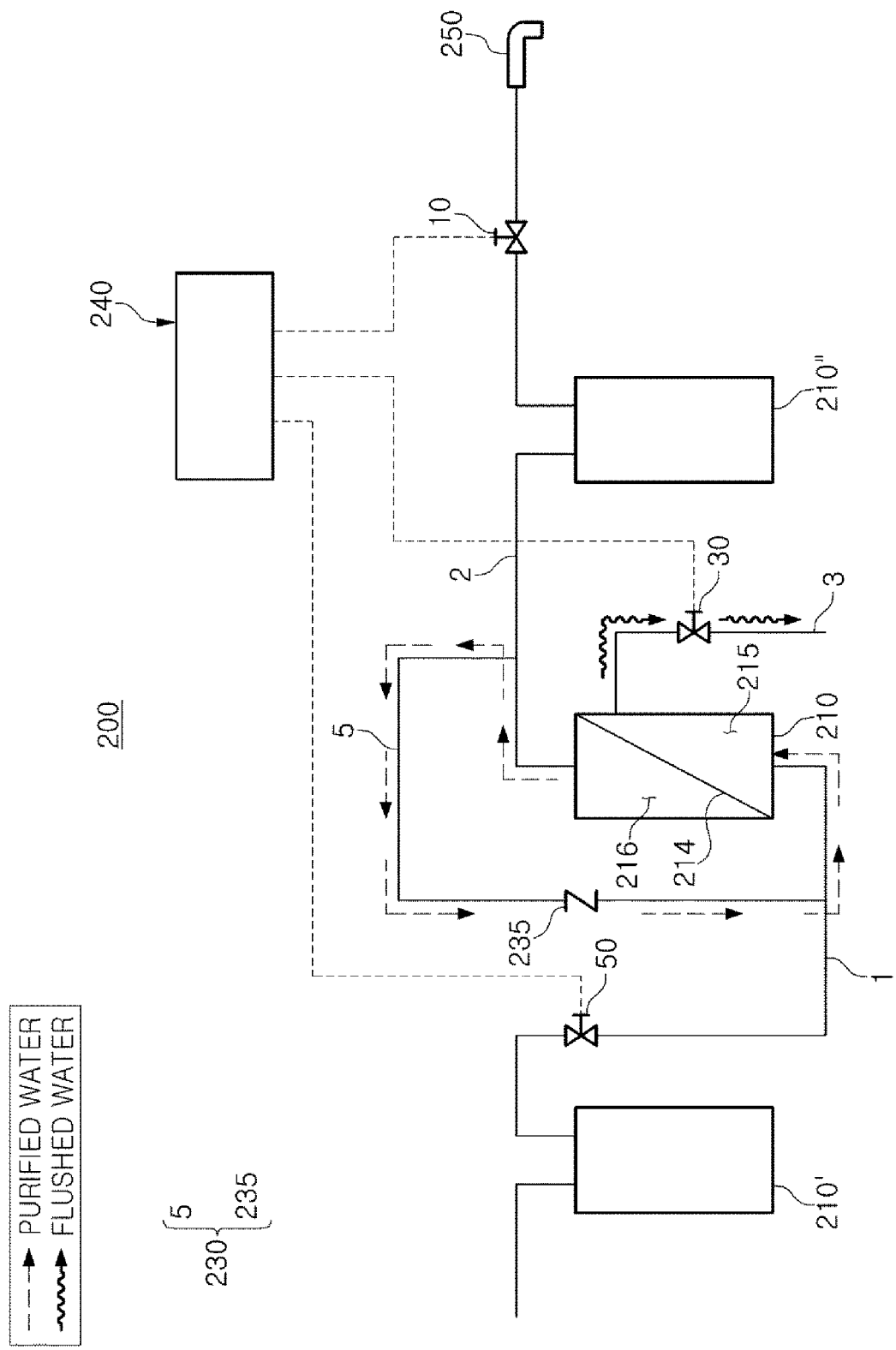

【FIG. 13】
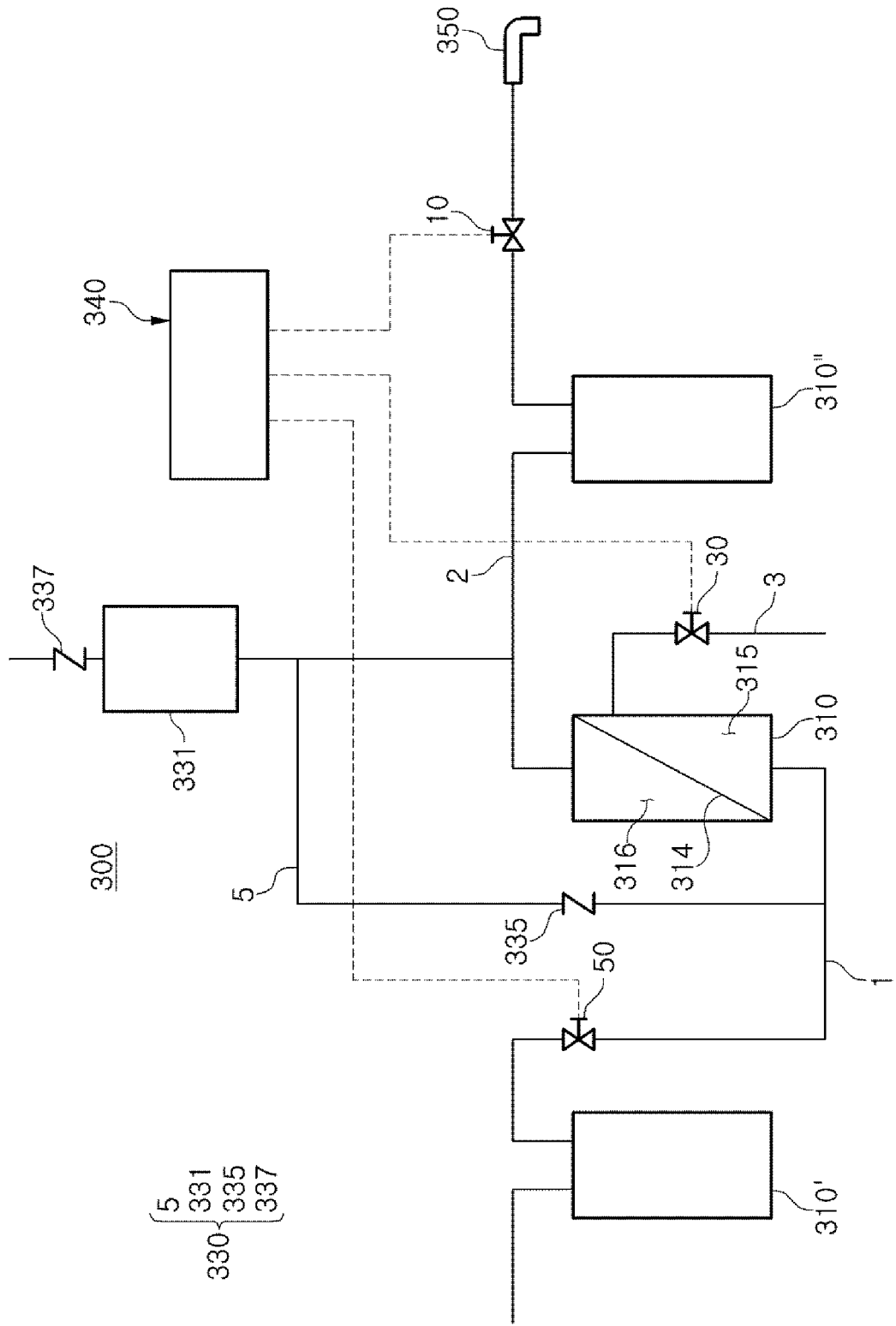

[FIG. 14]
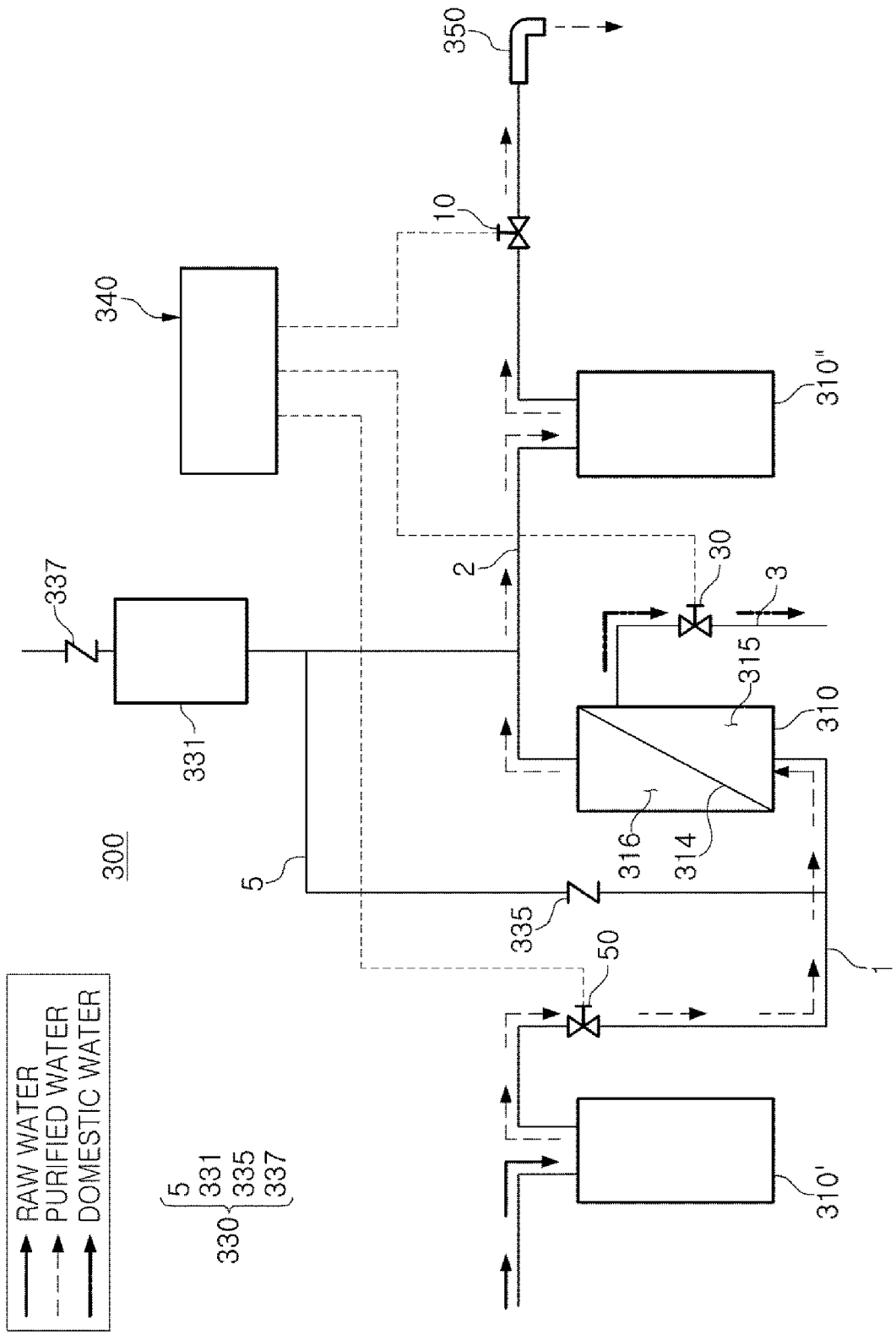

【FIG. 15】
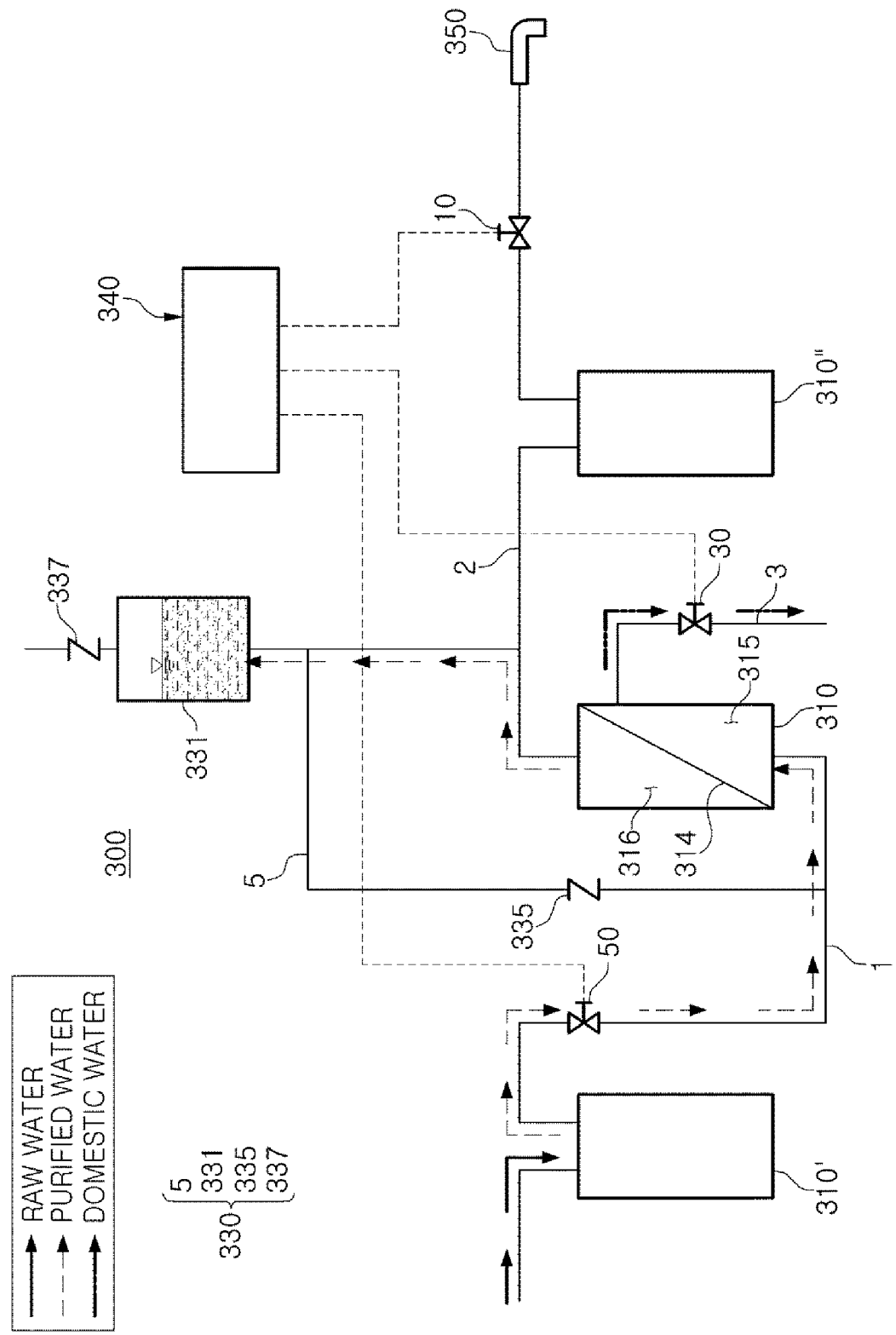

[FIG. 16]
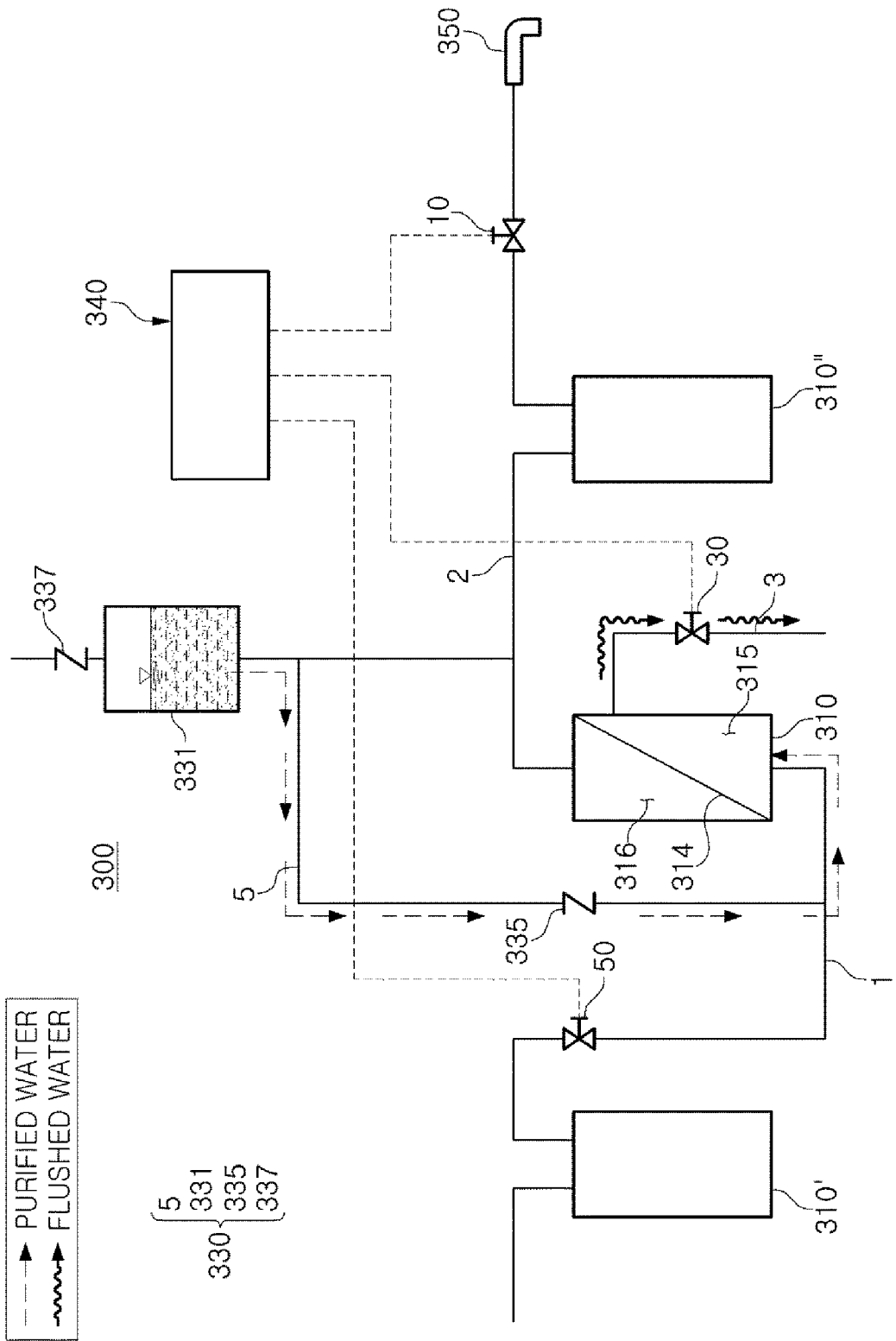

[FIG. 17]
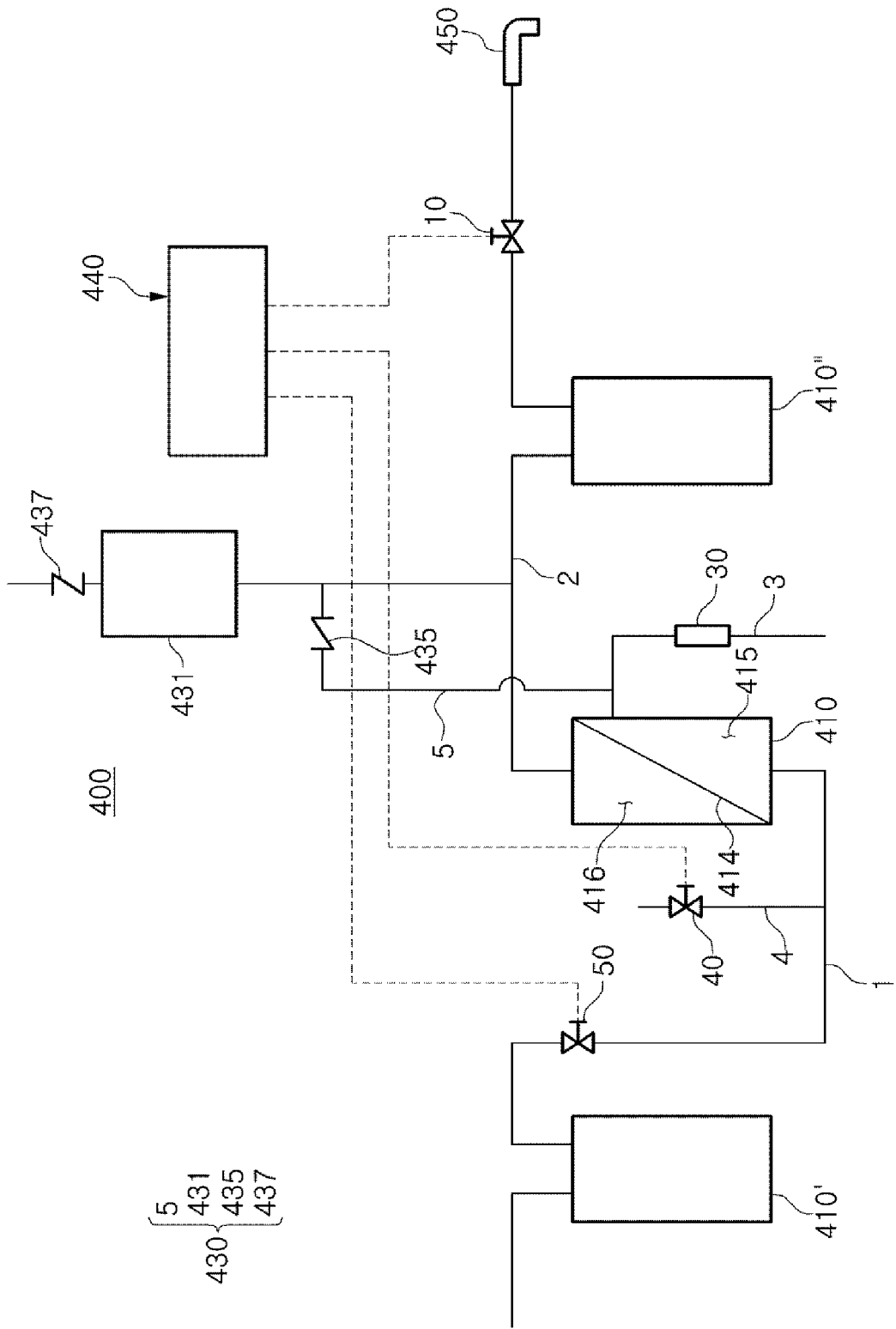

【FIG. 18】
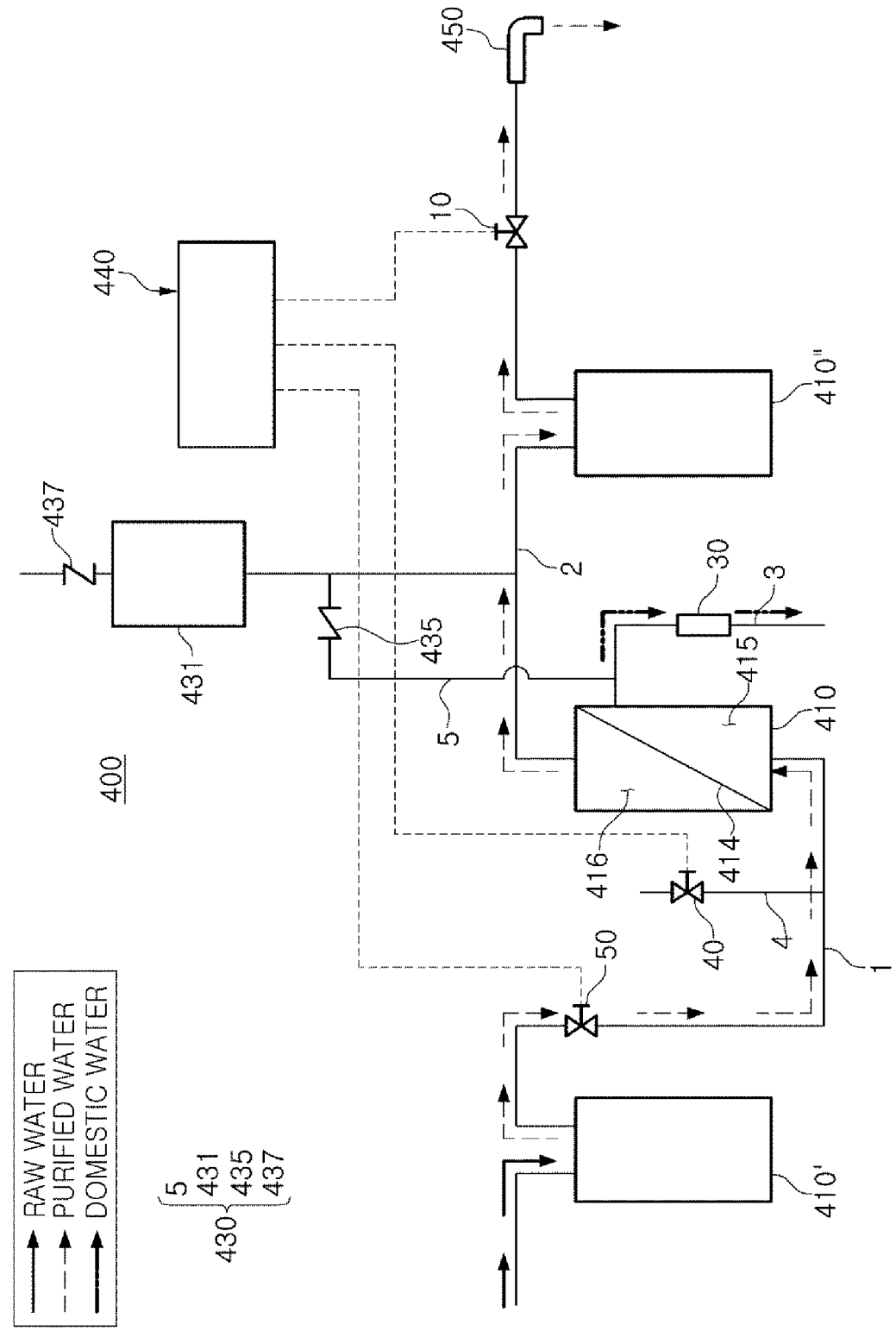

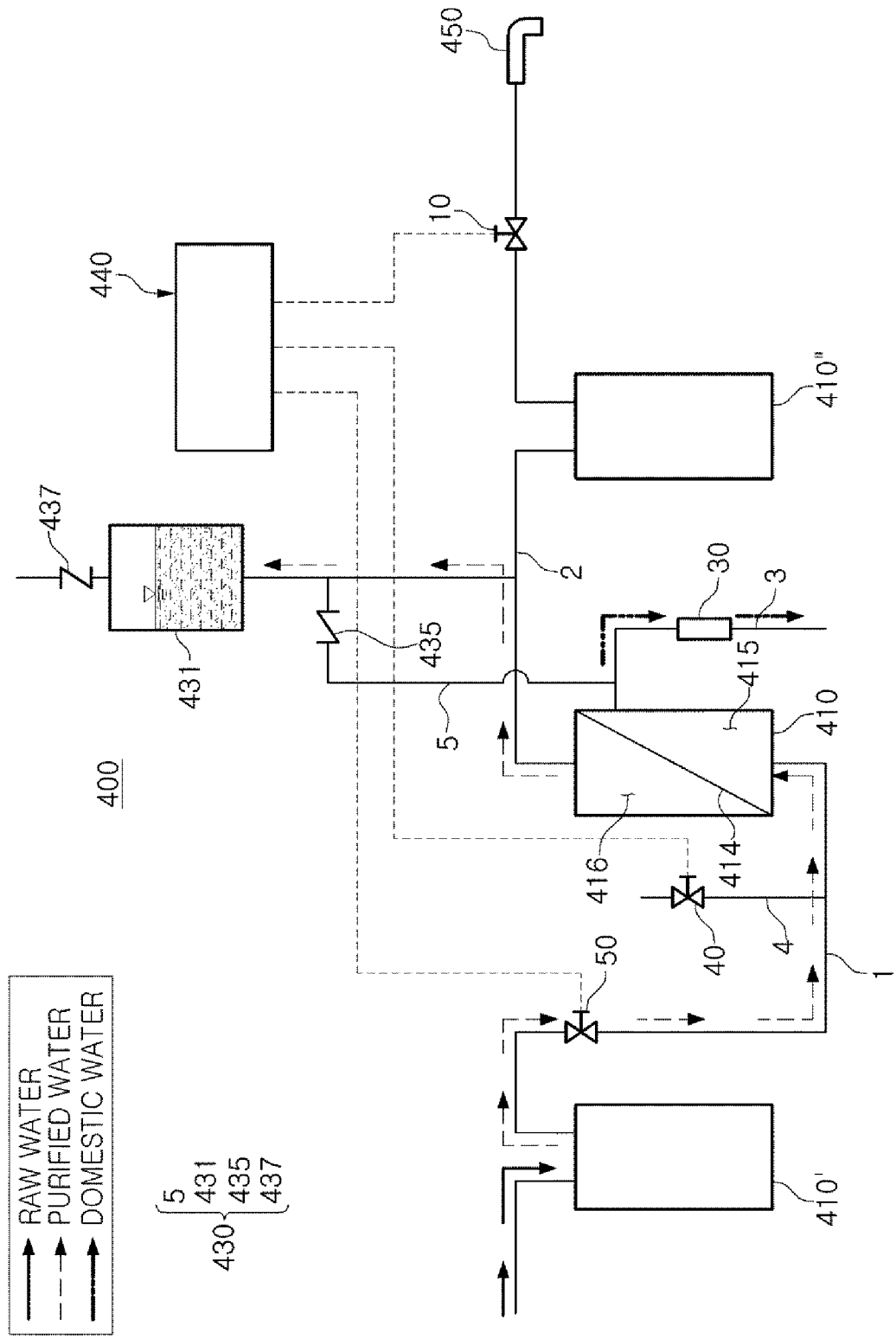
[FIG. 19]

[FIG. 20]
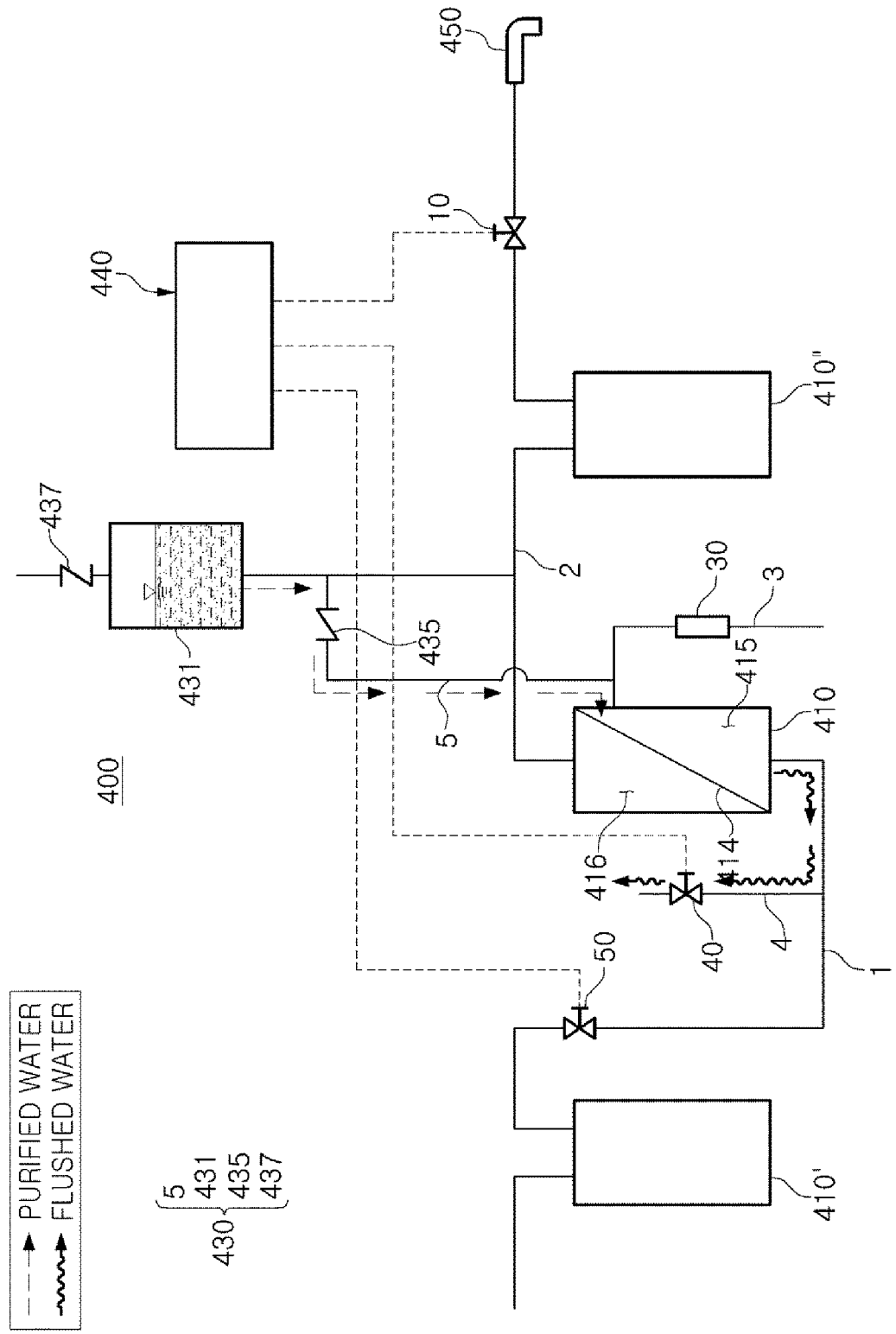

WATER PURIFIER AND CONTROL METHOD FOR WATER PURIFIER

PRIORITY

This application is a National Phase Entry of International Application No. PCT/KR2017/002437, which was filed on Mar. 7, 2017, and claims priority to Korean Patent Application Nos. 10-2016-0029359 and 10-2016-0128241, which were filed on Mar. 11, 2016 and Oct. 5, 2016, respectively, the content of each of which is incorporated herein by reference.

TECHNICAL FIELD

The present disclosure relates to a water purifier and a control method of the water purifier.

BACKGROUND ART

A water purifier may be a device that treats water and supplies the treated water to a user. In a water purifier, water may be treated, such as by being filtered or electrolyzed, to make alkaline water, or the like, or carbon dioxide may be dissolved in water to make carbonated water, and the treated water may then be supplied to a user.

In a case that water is filtered and supplied to a user, a water purifier may include a water filter for filtering water.

For example, a water purifier may include a reverse osmosis filter having a reverse osmosis membrane as a filter for purifying water. The reverse osmosis filter may be divided into a non-filtration side portion and a filtration side portion by the reverse osmosis membrane. When water is introduced into the non-filtration side portion of the reverse osmosis filter, water passing through the reverse osmosis membrane may be filtered, and water not passing through the reverse osmosis membrane may be drained as domestic water.

Meanwhile, in a case that the water is not filtered through the reverse osmosis filter, the water in the filtration side portion of the reverse osmosis filter may move to the non-filtration side portion due to osmotic pressure. Therefore, total dissolved solids (TDS) concentrations of the water in the filtration side portion and the non-filtration side portion of the reverse osmosis filter may be similar to each other.

In such a state, when the filtration of water through the reverse osmosis filter is started again, water having a relatively high TDS concentration in the filtration side portion of the reverse osmosis filter may initially be supplied to a user, known as a creep phenomenon.

In recent years, studies have been actively conducted into techniques for performing automatic flushing after extracting purified water to improve the lifespan and the creep phenomenon of the reverse osmosis filter. However, in a case of a water purifier performing automatic flushing, there is a problem in that a recovery rate may be lowered depending on extraction amounts of purified water.

DISCLOSURE

Technical Problem

There is a need for a water purifier performing automatic flushing in order to improve the creep phenomenon more efficiently in a water purifier using a reverse osmosis filter. Further, there is a need for a solution for solving the problem that the recovery rate decreases depending on cases, in the water purifier performing the automatic flushing.

Technical Solution

According to an aspect of the present disclosure, a control method of a water purifier includes: generating purified water by filtering inflowing water; extracting the generated purified water; measuring a flow rate of the purified water extracted per unit time; when the extraction of purified water is completed, flushing a filter unit by using purified water generated by the filter unit; and draining the flushed water externally through a domestic water outlet of the filter unit, wherein the generation of purified water shuts off a discharge of domestic water generated in the generation of purified water, depending on an accumulated flow rate at the time of one-time extraction of the purified water calculated on the basis of a flow rate of the purified water.

According to an aspect of the present disclosure, a water purifier includes: a filter unit configured to generate purified water by filtering water inflowing through a raw water inlet, discharge the purified water through a purified water outlet, and discharge domestic water generated during the generation of purified water through a domestic water outlet; a flow rate sensor measuring a flow rate of purified water discharged through the purified water outlet per unit time; a flushing portion connected to the purified water outlet and the raw water inlet, flushing the filter unit by using the purified water; and a controller configured to extract purified water discharged through the purified water outlet according to a purified water extracting input, to flush the filter unit by providing the purified water to the flushing portion when the extraction of purified water is completed, and to shut off the discharge of domestic water depending on an accumulated flow rate at the time of one-time extraction of the purified water calculated on the basis of a flow rate of the purified water.

Advantageous Effects

According to an aspect of the present disclosure, the creep phenomenon may be more efficiently improved by flushing the reverse osmosis filter with water filtered by the reverse osmosis filter. In addition, it is possible to solve the problem that the recovery rate is lowered, when an extraction amount of the purified water is relatively low, by shutting off the discharge of domestic water, or by releasing the shut-off, depending on a flow rate of extraction of the purified water.

DESCRIPTION OF DRAWINGS

FIG. 1 is a view illustrating a water purifier according to a first embodiment of the present disclosure;

FIG. 2 is a view illustrating a control operation of a controller, when an amount of extracted purified water exceeds a predetermined amount;

FIG. 3 is a view illustrating a control operation of a controller, when an amount of extracted purified water is lower than a predetermined amount;

FIG. 4 is a view illustrating an operation of storing purified water in a flushing tank;

FIG. 5 is a view illustrating a flushing operation;

FIG. 6 is a graph illustrating a recovery rate of a water purifier according to an embodiment of the present disclosure;

FIG. 7 is a view illustrating a control method of a water purifier according to an embodiment of the present disclosure;

FIG. 8 is a view illustrating an embodiment of an operation of flushing a filter unit of FIG. 7;

FIG. 9 is a schematic view illustrating a water purifier according to a second embodiment of the present disclosure;

FIGS. 10 to 12 are views illustrating operations of a water purifier according to a second embodiment of the present disclosure;

FIG. 13 is a schematic view illustrating a water purifier according to a third embodiment of the present disclosure;

FIGS. 14 to 16 are views illustrating operations of a water purifier according to a third embodiment of the present disclosure;

FIG. 17 is a schematic view illustrating a water purifier according to a fourth embodiment of the present disclosure; and FIGS. 18 to 20 are views illustrating operations of a water purifier according to a fourth embodiment of the present disclosure.

BEST MODE FOR INVENTION

Hereinafter, preferred embodiments of the present disclosure will be described with reference to the accompanying drawings.

However, the embodiments of the present disclosure may be modified to have various other forms, and the scope of the present disclosure is not limited to the embodiments described below. Further, the embodiments of the present disclosure are provided to more fully explain the present disclosure to those skilled in the art.

In the drawings referred to in the present disclosure, elements having substantially the same constructions and functions will be denoted by the same reference numerals, and the shapes and sizes of the elements and the like in the drawings may be exaggerated for clarity.

FIG. 1 is a view illustrating a water purifier according to a first embodiment of the present disclosure.

Referring to FIG. 1, a water purifier 100 according to a first embodiment of the present disclosure may include a filter unit 110, a flow rate sensor 120, a flushing portion 130, and a controller 140. In addition, the water purifier 100 may also include a raw water flow path 1 for introducing raw water, a purified water flow path 2 for discharging purified water, a domestic water flow path 3 for discharging domestic water, a flushing flow path 4 for discharging flushed water, and a flushing purified water supplying flow path 5 for supplying purified water to be flushed to the filter unit 110. Valves 10, 30, 40, and 50, or a check valve 135, may be provided to control flow of water. A water inflow pump 21 may be additionally provided at one point on the raw water flow path 1, for example, between a water inflow valve 50 and a second flow path switching valve 133 to smoothly introduce raw water into the filter unit 110, as needed.

The filter unit 110 may filter raw water flowing from the raw water flow path 1 to generate purified water. In this case, the filter unit 110 may include a raw water inlet 111 connected to the raw water flow path 1, a purified water outlet 112 connected to the purified water flow path 2 for discharging purified water, and a domestic water outlet 113 connected to the domestic water flow path 3 for discharging the domestic water generated during the generation of purified water. The filter unit 110 may be a reverse osmosis filter.

The flow rate sensor 120 may be disposed in the purified water flow path 2, and may sense a flow rate of purified water discharged from the purified water outlet 112 of the filter unit 110. The flow rate sensor 120 may sense a flow rate of purified water discharged through the purified water flow path 2 per unit time, and may output a value of the sensed flow rate to the controller 140.

The flushing portion 130 may be a portion for cleaning the filter unit 110, may store purified water discharged through the purified water outlet 112, and may supply the stored purified water to the filter unit 110 through the raw water inlet 111.

In one embodiment, the flushing portion 130 may include a flushing tank 131, a first flow path switching valve 132, a second flow path switching valve 133, and a third flow path switching valve 134, which are configured to store purified water discharged from the purified water outlet 112 of the filter unit 110, and to supply the purified water to the raw water inlet 111 of the filter unit 110. The flushing portion 130 may further include a first check valve 135, installed on the flushing purified water supplying flow path 5 connecting between the second flow path switching valve 133 and the third flow path switching valve 134 to prevent a reverse flow of the raw water.

The flushing pump 22 may be further provided, as needed, at one point on the flushing purified water supplying flow path 5 to supply smoothly purified water during the flushing operation.

The flushing portion 130 may further include a fourth flow path switching valve 136, a flushing flow path 4, and a flushing valve 40, which are configured to discharge the flushed water of the filter unit 110 externally. In addition, a first domestic water valve 20 for preventing a reverse flow of domestic water, and a second domestic water valve 30 for shutting off domestic water may be arranged in the domestic water flow path 3.

The flushing portion 130 may be operated under control of the controller 140. A specific operation of the flushing portion 130 will be described in detail with reference to FIGS. 4 to 5.

The controller 140 may control the overall operation of the water purifier.

When a purified water extracting input is provided, the controller 140 may generate purified water by introducing raw water into the filter unit 110, and may extract the purified water through an extract port.

The controller 140 may flush the filter unit 110 to improve the lifetime of the filter unit 110 and a reverse osmosis (RO) creep phenomenon, when the extraction of purified water is completed.

In this case, even in a case that an amount of water extracted at the time of extraction of one time is very low, when the flushing proceeds, there may be problems that a recovery rate is lowered, and an amount of water to be discarded is increased.

In order to solve such problems, the controller 140 may shut-off the discharge of domestic water, when an amount of purified water extracted at the time of one-time water purification is lower than a predetermined amount. In other words, the accumulated flow rate of the purified water is an accumulated flow rate from the start of the extraction of purified water to the completion of the extraction of purified water.

In this case, the predetermined amount may be an amount whose variation of a TDS value of purified water generated by the filter unit 110 may be within a predetermined range, even when the discharge of domestic water is shut off. In one embodiment, the predetermined amount may be determined by a preliminary experiment. In addition, the predetermined amount may be proportional to a capacity of the filter unit.

In one embodiment, the controller 140 may include at least one of a processing unit and a memory. The processing unit may include a central processing unit CPU, a graphics processing unit GPU, a microprocessor, an application specific integrated circuit ASIC, a field programmable gate array FPGA, or the like, and may have a plurality of cores. The memory may be a volatile memory, a non-volatile memory, or a combination thereof.

FIG. 2 is a view illustrating a control operation of a controller, when an amount of extracted purified water exceeds a predetermined amount.

Referring to FIG. 2, the controller 140 may control the fourth flow path switching valve 136 and the second domestic water valve 30 to discharge domestic water generated by the filter unit 110 externally through the domestic water flow path 3, when an accumulated flow rate at the time of one-time water purification calculated based on the flow rate of the purified water per unit time measured by the flow rate sensor 120 is equal to or greater than a value of a predetermined amount (for example, 0.5 liter).

FIG. 3 is a view illustrating a control operation of a controller, when an amount of extracted purified water is lower than a predetermined amount.

Referring to FIG. 3, the controller 140 may control the fourth flow path switching valve 136 and the second domestic water valve 30 to shut-off the discharge of the domestic water, when an accumulated flow rate at the time of one-time water purification calculated based on the flow rate of the purified water per unit time measured by the flow rate sensor 120 is less than a value of a predetermined amount (for example, 0.5 liter).

In one embodiment, in the second domestic water valve 30, a state in which a valve of the second domestic water valve 30 is closed may be set as a default.

For example, the second domestic water valve 30 may maintain the shut-off state. Depending on an input state of a purified water extracting input, purified water may be generated and extracted. When an accumulated flow rate of the extracted purified water is equal to or larger than a predetermined amount, the controller 140 may control the second domestic water valve 30 to discharge domestic water externally.

FIG. 4 is a view illustrating an operation of storing purified water in a flushing tank.

FIG. 4, when an extraction of purified water is completed, the controller 140 may control the first flow path switching valve 132 such that purified water discharged through the purified water outlet 112 of the filter unit 110 is stored in the flushing tank 131.

FIG. 5 is a view illustrating a flushing operation.

Referring to FIG. 5, the controller 140 may control the water inflow valve 50 to shut-off raw water inflowing into the filter unit 110, and may control the second flow path switching valve 133 and the third flow path switching valve 134 to provide purified water stored in the flushing tank 131 to the raw water inlet 111 of the filter unit 110, when purified water of an amount equal to or larger than a predetermined amount is stored in the flushing tank 131.

The controller 140 may control the fourth flow path switching valve 136 and the flushing valve 40 to discharge purified water inflowing into the filter unit 110 externally through the flushing flow path 4.

FIG. 6 is a graph illustrating a recovery rate of a water purifier according to an embodiment of the present disclosure.

Referring to FIG. 6, it is confirmed that the present disclosure (a) in which domestic water is shut-off depending on an accumulated flow rate at the time of one-time extraction of purified water may be improved in terms of the recovery rate than the conventional case (b) in which domestic water is not shut-off regardless of an accumulated flow rate, in a low extraction amount section.

Hereinafter, a control method of a water purifier according to an embodiment of the present disclosure will be described with reference to FIGS. 7 to 8.

The following control method of the water purifier may be performed in the water purifier according to the first embodiment described above with reference to FIGS. 1 to 6, and hence the same or equivalent contents will not be described in duplicate.

However, a water purifier to which a control method of a water purifier to be described later is applied is not limited to the first embodiment described above, but may be applied to a water purifier according to second to fourth embodiments to be described later, for example.

FIG. 7 is a view illustrating a control method of a water purifier according to an embodiment of the present disclosure, and FIG. 8 is a view illustrating an embodiment of an operation of flushing a filter unit of FIG. 7.

Referring to FIG. 7, a controller 140 may generate purified water by introducing raw water into a filter unit 110, depending on a purified water extracting input (S100).

The generated purified water may be extracted through a purified water flow path 2 (S200).

A flow rate sensor 120 may measure a flow rate of purified water extracted through the purified water flow path 2 per unit time (S300).

When an accumulated flow rate at the time of one-time extraction of purified water calculated on the basis of a flow rate of the purified water per unit time measured by the flow rate sensor 120 is lower than a predetermined amount (S400), the controller 140 may control a second domestic water valve 30 and a fourth flow path switching valve 136 to shut-off discharge of domestic water (S500). Meanwhile, when an accumulated flow rate at the time of one-time extraction of purified water calculated on the basis of a flow rate of the purified water per unit time measured by the flow rate sensor 120 is equal to or larger than a predetermined amount (S400), the controller 140 may control a second domestic water valve 30 and a fourth flow path switching valve 136 to release the shut-off of the discharge of domestic water (S550). According to an embodiment, in a case that a state in which a second domestic water valve 30 is closed is set as a default, when the discharge of the domestic water is shut-off (S500), a state of the second domestic water valve 30 may be maintained as it is, i.e., as closed; while, when the shut-off of the discharge of the domestic water is released (S550), the second domestic water valve 30 may be opened to discharge the domestic water.

The controller 140 may flush the filter unit 110 using purified water generated by the filter unit 110 (S600).

In one embodiment, the flushing operation (S600) may include an operation of storing the purified water generated in the filter unit 110 in the flushing tank 131 (S610), and an operation of supplying the purified water stored in the flushing tank to a raw water inlet 111 of the filter unit 110 (S620).

The controller 140 may control a fourth flow path switching valve 136 to drain flushed water externally (S700).

Hereinafter, a water purifier according to a second embodiment of the present disclosure will be described with reference to FIGS. 9 to 12.

FIG. 9 is a schematic view illustrating a water purifier according to a second embodiment of the present disclosure, and FIGS. 10 to 12 are views illustrating operations of a water purifier according to a second embodiment of the present disclosure.

As illustrated in FIG. 9, a water purifier 200 according to a second embodiment of the present disclosure may include filter units 210, 210', and 210", a flushing portion 230, a controller 240, and a discharge unit 250.

The filter units 210, 210', and 210" may filter water supplied from a water source. To this end, the filter unit 210 may be a reverse osmosis filter 210, and may include a pre-treatment filter 210' and a post-treatment filter 210" at front and rear ends of the reverse osmosis filter 210, respectively.

The reverse osmosis filter 210 may be partitioned into a non-filtration side portion 215 and a filtration side portion 216 by a reverse osmosis membrane 214, as illustrated in FIG. 9. For example, the reverse osmosis filter 210 may be partitioned into the non-filtration side portion 215 and the filtration side portion 216 by providing the reverse osmosis membrane 214 in a rolled state within the reverse osmosis filter 210.

The configuration in which the reverse osmosis filter 210 is partitioned into the non-filtration side portion 215 and the filtration side portion 216 by the reverse osmosis membrane 214 is not particularly limited, but any well-known configurations are possible.

A raw water flow path 1 and a domestic water flow path 3 may be connected to the non-filtration side portion 215 of the reverse osmosis filter 210.

Water may be introduced into the reverse osmosis filter 210, i.e., the non-filtration side portion 215 of the reverse osmosis filter 210 through the raw water flow path 1, as illustrated in FIGS. 10 to 12.

In addition, as illustrated in FIGS. 10 and 11, domestic water which has not passed through a reverse osmosis membrane 214 of a reverse osmosis filter 210 and has not filtered, may be drained externally through a domestic water flow path 3.

Meanwhile, as illustrated in FIG. 12, flushed water that has been flushed with a reverse osmosis filter 210, i.e., anon-filtration side portion 215 of the reverse osmosis filter 210, may be drained externally through a domestic water flow path 3.

The raw water flow path 1 may be provided with a water inflow valve 50. The water inflow valve 50 may be electrically connected to the controller 240. When the water inflow valve 50 is opened by the controller 240, water may be introduced into the reverse osmosis filter 210 through the raw water flow path 1, as illustrated in FIGS. 10 and 11. The water inflow valve 50 may be installed at a rear end of the pre-treatment filter 210', as illustrated in FIGS. 9 to 12. However, the position of the water inflow valve 50 is not limited thereto. For example, the water inflow valve 50 may be installed at a front end of the pre-treatment filter 210'.

A domestic water valve 30 may be provided on the domestic water flow path 3. As illustrated in FIGS. 10 and 11, domestic water that has not been filtered by the reverse osmosis filter 210 may be drained externally by the domestic water valve 30, or, as illustrated in FIG. 12, flushed water that has flushed the reverse osmosis filter 210 may be drained externally. Although FIGS. 9 to 12 illustrate that both the domestic water and the flushed water are discharged through one domestic water flow path 3, the domestic water flow path and the flushing flow path may be separately provided such that the domestic water and the flushed water are discharged through separate flow paths. In this case, valves may be installed in each of the flow paths, respectively.

The purified water flow path 2 may be connected to the filtration side portion 216 of the reverse osmosis filter 210. The filtered water may be discharged through the reverse osmosis membrane 214 of the reverse osmosis filter 210 through the purified water flow path 2, as illustrated in FIGS. 10 and 11.

As described above, in order to filter water supplied from the water source, the filter units 210, 210', and 210" may further include a pre-treatment filter 210' and a post-treatment filter 210", as illustrated in FIG. 9, in addition to the reverse osmosis filter 210 described above.

In the filter units 210, 210', and 210", the purified water filter further included in addition to the reverse osmosis filter 210 for filtering water supplied from the water source is not particularly limited, and any well-known water filters may be included.

The pre-treatment filter 210' may be connected to a water source (not illustrated), for example, a source of raw water, such as tap water, by a water inflow line, as illustrated in FIG. 9. In addition, the pre-treatment filter 210' may be connected to the reverse osmosis filter 210 by the raw water flow path 1.

Therefore, when the water inflow valve 50 of the raw water flow path 1 is opened by the controller 240, water of the water source, for example, raw water, may first be introduced into the pre-treatment filter 210' through the water inflow line, and may be filtered, as illustrated in FIGS. 10 and 11.

The water filtered by the pre-treatment filter 210, i.e., the purified water may be introduced into the reverse osmosis filter 210 through the raw water flow path 1.

The post-treatment filter 210" may be connected to the reverse osmosis filter 210 by the purified water flow path 2. The post-treatment filter 210" may also be connected to the discharge unit 250 by a water outflow line. The water outflow line may be provided with a water outflow valve 10 electrically connected to the controller 240.

Therefore, when the water outflow valve 10 is opened by the controller 240, the water filtered by the reverse osmosis filter 210, i.e., the purified water may be introduced into the post-treatment filter 210" through the purified water flow path 2, and may be filtered, as illustrated in FIG. 10.

The water filtered by the post-treatment filter 210", i.e., the purified water may flow through the water outflow line, may be discharged externally through the discharge unit 250, and may be supplied to a user.

The discharge unit 250 may discharge the water filtered by the filter units 210, 210', and 210", i.e., the purified water externally, as illustrated in FIG. 10.

The discharge unit 250 may be connected to the filter unit 210, 210', and 210", such as the post-treatment filter 210" by the water outflow line, as illustrated in FIG. 9.

When the water outflow valve 10 of the water outflow line may be opened by the controller 240, the water filtered in the filter units 210, 210', and 210", i.e., the purified water may be discharged externally through the discharge unit 250, and may be supplied to a user.

The discharge unit 250 may include, for example, a cock or a faucet (not illustrated), connected to a water outflow line, and discharges the water filtered by the filter units 210, 210', and 210", i.e., the purified water. However, the structure of the discharge unit 250 is not particularly limited, and any known structure may be used as long as it is capable of discharging the water filtered by the filter unit 210, 210', and 210" externally.

The flushing portion 230 may be connected to the reverse osmosis filter 210. The flushing portion 230 may include a flushing purified water supplying flow path 5, connected to the raw water flow path 1 connected to the non-filtration side portion 215 of the reverse osmosis filter 210, and the purified water flow path 2 connected to the filtration side portion 216 of the reverse osmosis filter 210, respectively, as illustrated in FIG. 9.

A first check valve 235 for allowing water to only flow in the direction of the raw water flow path 1 may be provided in the flushing purified water supplying flow path 5. Therefore, as illustrated in FIGS. 10 and 11, when the water filtered by the pre-treatment filter 210' flows into the reverse osmosis filter 210 through the raw water flow path 1, the water filtered by the pre-treatment filter 210' may not flow into the flushing purified water supplying flow path 5 through the raw water flow path 1.

As illustrated in FIGS. 11 and 12, only when the reverse osmosis filter 210 is flushed, the water filtered through the reverse osmosis filter 210, i.e., the purified water may be introduced into and flow into the flushing purified water supplying flow path 5 through the purified water flow path 2.

As described above, the water flowing into the flushing purified water supplying flow path 5 may flow into the reverse osmosis filter 210 through the raw water flow path 1 to flush the reverse osmosis filter 210, and may be drained externally through the domestic water flow path 3, as illustrated in FIG. 12.

Meanwhile, a flushing valve (not illustrated), other than the first check valve 235 described above, may be provided in the flushing purified water supplying flow path 5. The flushing valve may be electrically connected to the controller 240.

In such a configuration, when the water filtered by the pre-treatment filter 210' is introduced into the reverse osmosis filter 210 through the raw water flow path 1, the flushing valve of the flushing purified water supplying flow path 5 may be closed by the controller 240, as illustrated in FIGS. 10 and 11.

Further, as illustrated in FIG. 12, the flushing valve of the flushing purified water supplying flow path 5 may be opened by the controller 240, only when the reverse osmosis filter 210 is flushed.

The controller 240 may flow the water filtered by the reverse osmosis filter 210 to the flushing portion 230, and flush the reverse osmosis filter 210, i.e., the non-filtration side portion 215 of the reverse osmosis filter 210.

Thereby, the non-filtration side portion 215 of the reverse osmosis filter 210 may also have water with a low TDS concentration, for example, similar to a TDS concentration in the filtration side portion 216.

Even when water is not filtered through the filter units 210, 210', and 210" including the reverse osmosis filter 210, the water in the filtration side portion 216 of the reverse osmosis filter 210 may not move to the non-filtration side portion 215 by osmosis.

Thus, a TDS concentration of water present in the filtration side portion 216 of the reverse osmosis filter 210 may not be increased.

Therefore, when the filtration of water in the filter units 210, 210', and 210" including the reverse osmosis filter 210 is restarted, water having a low TDS concentration may be discharged, even at the beginning of filtration to supply the same to a user.

Accordingly, when water is filtered using the reverse osmosis filter 210, water having a high TDS concentration may be discharged at the initial stage of filtration, and may be not supplied to a user.

The controller 240 may be electrically connected to the above-described water inflow valve 50 for supplying water to the filter units 210, 210', and 210", and to the above-described water outflow valve 10 for discharging the filtered water through the discharge unit 250, respectively.

The controller 240 may open and close the water inflow valve 50 and the water outflow valve 10 with a predetermined time difference, such that the water filtered by the reverse osmosis filter 210 flows into the flushing portion 230, for example, into the flushing purified water supplying flow path 5 of the flushing portion 230.

To this end, the controller 240 may close the water outflow valve 10, after discharging the water filtered through the filter units 210, 210', and 210", i.e., the purified water through the discharge unit 250, and close the water inflow valve 50 after a predetermined first set time.

When the water inflow valve 50 and the water outflow valve 10 are opened by the controller 240, the water of the water source, for example, the raw water, may be introduced into the pre-treatment filter 210' through the water inflow valve, and may be filtered, as illustrated in FIG. 10.

The water filtered by the pre-treatment filter 210', i.e., purified water may be introduced into the reverse osmosis filter 210 through the raw water flow path 1.

Further, as illustrated in FIG. 10, the water filtered by the reverse osmosis filter 210 may be introduced into the post-treatment filter 210" through the purified water flow path 2, and the water not filtered by the reverse osmosis filter 210, i.e., the domestic water may be drained externally through the domestic water flow path 3.

In addition, the water introduced into the post-treatment filter 210" may be filtered by the post-treatment filter 210", may flow through the water outflow line, may be discharged externally through the discharge unit 250, and may be supplied to a user.

After the water filtered by the filter units 210, 210', and 210", i.e., the purified water, is discharged through the discharge unit 250 by a predetermined amount desired by a user, the controller 240 may firstly close the water outflow valve 10, as illustrated in FIG. 11.

Thus, the water that is filtered by the reverse osmosis filter 210 and flows in the purified water flow path 2, i.e., the purified water, may be not introduced into the post-treatment filter 210", and may be introduced into the flushing purified water supplying flow path 5 of the flushing portion 230.

After the water outflow valve 10 is closed and a predetermined first set time proceeds, the controller 240 may close the water inflow valve 50.

Thus, the water filtered by the reverse osmosis filter 210 introducing into the flushing purified water supplying flow path 5 of the flushing portion 230, i.e., the purified water, may be introduced into the reverse osmosis filter 210, i.e., the non-filtration side portion 215 of the reverse osmosis filter 210 through the flushing purified water supplying flow path 5 and the raw water flow path 1, as illustrated in FIG. 12.

The first set time described above may be, for example, a time at which a sufficient amount of filtered water capable of flushing the reverse osmosis filter 210 may be introduced into the flushing purified water supplying flow path 5 of the flushing portion 230.

The first set time is not particularly limited, and may be anytime as long as it is necessary to flush the reverse osmosis filter 210.

As described above, the water introduced into the non-filtration side portion 215 of the reverse osmosis filter 210 may flush the non-filtration side portion 215 of the reverse osmosis filter 210, and then, as illustrated in FIG. 12, may be drained externally through the domestic water flow path 3.

The flushing of such a reverse osmosis filter 210 may be performed by the controller 240 for a predetermined second set time. For example, the controller 240 may close the water inflow valve 50, and may close the domestic water valve 30 after a predetermined second set time.

The second set time is not particularly limited, and may be anytime as long as it is sufficient to flush the reverse osmosis filter 210.

Hereinafter, a water purifier according to a third embodiment of the present disclosure will be described with reference to FIGS. 13 to 16.

FIG. 13 is a schematic view illustrating a water purifier according to a third embodiment of the present disclosure, and FIGS. 14 to 16 are views illustrating operations of a water purifier according to a third embodiment of the present disclosure.

There is a difference that the water purifier according to the third embodiment of the present disclosure may include the water purifier 200 according to the second embodiment of the present disclosure described with reference to FIGS. 9 to 12, and may further include a flushing tank 331 in a flushing portion 330.

Therefore, the configurational difference will be mainly described below, and the remaining configurations may be replaced with those described with reference to FIGS. 9 to 12 above.

In a water purifier 300 according to the third embodiment of the present disclosure, a flushing portion 330 may further include a flushing tank 331, as illustrated in FIG. 13.

The flushing tank 331 may be connected to a flushing purified water supplying flow path 5. In the flushing tank 331, water filtered by a reverse osmosis filter 310, i.e., purified water, may be stored, as illustrated in FIG. 15. The filtered water stored in the flushing tank 331 may be discharged from the flushing tank 331 to flush the reverse osmosis filter 310, as illustrated in FIG. 16.

In such a configuration, when the water inflow valve 50 and the water outflow valve 10 are opened by the controller 340, water of water source, for example, raw water may be introduced into the pre-treatment filter 310' through a water inflow line, and may be firstly filtered, as illustrated in FIG. 14.

The water filtered by the pre-treatment filter 310' may be introduced into the reverse osmosis filter 310 through the raw water flow path 1.

Further, as illustrated in FIG. 14, the water filtered by the reverse osmosis filter 310 may be introduced into the post-treatment filter 310" through the purified water flow path 2 and may be filtered. The water that is not filtered by the reverse osmosis filter 310, i.e., the domestic water, may be drained externally through the domestic water flow path 3.

The water filtered by the post-treatment filter 310" may flow in the water outflow line, may be discharged externally through the discharge unit 350, and may be supplied to a user.

After the water filtered by the filter units 310, 310', and 310", i.e., the purified water, is discharged through the discharge unit 350 in a predetermined amount desired by a user, the controller 340 may firstly close the water outflow valve 10, as illustrated in FIG. 15.

Thus, the water that is filtered by the reverse osmosis filter 310 and flows in the purified water flow path 2, i.e., the purified water may be not introduced into the post-treatment filter 310", and may be introduced into the flushing purified water supplying flow path 5 of the flushing portion 330.

Further, the water filtered by the reverse osmosis filter 310 introducing into the flushing purified water supplying flow path 5 may flow in the flushing purified water supplying flow path 5, and may be stored in the flushing tank 331.

After the water outflow valve 10 is closed and a predetermined first set time proceeds, the controller 340 may close the water inflow valve 50.

Thus, the water filtered by the reverse osmosis filter 310 stored in the flushing tank 331 of the flushing portion 330 may be introduced into the reverse osmosis filter 310, i.e., the non-filtration side portion 315 of the reverse osmosis filter 310 through the flushing purified water supplying flow path 5 and the raw water flow path 1, as illustrated in FIG. 16.

In this case, the first set time described above may be, for example, a time at which a sufficient amount of filtered water capable of flushing the reverse osmosis filter 310 may be introduced into and stored in the flushing tank 331 of the flushing portion 330.

The first set time is not particularly limited, and may be any time as long as it is necessary to flush the reverse osmosis filter 310.

The water introduced into the non-filtration side portion 315 of the reverse osmosis filter 310 may flush the non-filtration side portion 315 of the reverse osmosis filter 310, and may be then drained externally through the domestic water flow path 3, as illustrated in FIG. 16.

Further, after the water inflow valve 50 is closed, and a predetermined second set time proceeds, for example, the controller 340 may close the domestic water valve 30 to flush the reverse osmosis filter 310 for a second set time.

The second set time is not particularly limited, and may be any time as long as it is sufficient to flush the reverse osmosis filter 310.

Meanwhile, the flushing tank 331 of the flushing portion 330 may always have an air layer, as illustrated in FIGS. 14 to 16.

For this purpose, the flushing tank 331 may be provided with a second check valve 337 as illustrated in FIG. 13. As illustrated in FIG. 15, when the water filtered by the reverse osmosis filter 310 is stored in the flushing tank 331, the air inside the flushing tank 331 may not be discharged externally.

As illustrated in FIG. 14, when filtered water is not introduced into and not stored in the flushing tank 331, since the flushing tank 331 is empty, an air layer exists in the flushing tank 331. That is, in this case, the flushing tank 331 may be entirely filled with air.

Further, as illustrated in FIG. 15, when the filtered water is stored in the flushing tank 331, air in the flushing tank 331 may not be discharged externally by the second check valve 337, and may be compressed inside the flushing tank 331.

Thus, in this case, the air layer may be also present in the flushing tank 331.

When the water filtered by the reverse osmosis filter 310 is stored in the flushing tank 331, until the air layer of the flushing tank 331 is no longer compressed or until the air layer is compressed to a predetermined pressure, the filtered water stored in the flushing tank 331 may be discharged from the flushing tank 331 by the pressure of the air layer.

The filtered water stored in the flushing tank 331 may be introduced into the reverse osmosis filter 310 through the flushing purified water supplying flow path 5 and the raw water flow path 1, and may flush the reverse osmosis filter 310, as described above.

Hereinafter, a water purifier according to a fourth embodiment of the present disclosure will be described with reference to FIGS. 17 to 20.

FIG. 17 is a schematic view illustrating a water purifier according to a fourth embodiment of the present disclosure, and FIGS. 18 to 20 are views illustrating operations of a water purifier according to a fourth embodiment of the present disclosure.

There is a difference that water purifier according to the fourth embodiment of the present disclosure may include the water purifier 200 according to the second embodiment of the present disclosure described with reference to FIGS. 9 to 12, and may further include a connection relationship of the flushing purified water supplying flow path 5 in the flushing portion 430, and a flushing tank 431 in a flushing portion 430.

Therefore, the configurational difference will be mainly described below, and the remaining configurations may be replaced with those described with reference to FIGS. 9 to 12 above.

In a water purifier 400 according to the fourth embodiment of the present disclosure, a flushing purified water supplying flow path 5 of a flushing portion 430 may be connected to a domestic water flow path 3 connected to a non-filtration side portion 415 of a reverse osmosis filter 410, and a purified water flow path 2 connected to a filtration side portion 416 of a reverse osmosis filter 410, respectively, as illustrated in FIG. 17.

In addition, a first check valve 435 or a flushing valve may be provided in the flushing purified water supplying flow path 5 to allow water to flow only in a direction of a domestic water flow path 3.

A flushing flow path 4 having a flushing valve 40 may be connected to a raw water flow path 1.

In addition, a domestic water valve 30 may be provided in the domestic water flow path 3.

The flushing portion 430 may include a flushing tank 431 connected to the flushing purified water supplying flow path 5.

In addition, a second check valve 437 may be provided to prevent air from being discharged externally such that the air layer is always present in the flushing tank 431, during storage of the filtered water.

In such a configuration, when the water inflow valve 50 and the water outflow valve 10 are opened by the controller 440, water of water source, for example, raw water may be introduced into the pre-treatment filter 410' through a water inflow line, and may be firstly filtered, as illustrated in FIG. 18.

The water filtered by the pre-treatment filter 410' may be introduced into the reverse osmosis filter 410 through the raw water flow path 1.

Further, as illustrated in FIG. 18, the water filtered by the reverse osmosis filter 410 may be introduced into the post-treatment filter 410" through the purified water flow path 2 and may be filtered. The water that is not filtered by the reverse osmosis filter 410, i.e., the domestic water, may be drained externally through the domestic water flow path 3.

The water filtered by the post-treatment filter 410" may flow in the water outflow line, may be discharged externally through the discharge unit 450, and may be supplied to a user.

After the water filtered by the filter units 410, 410', and 410", i.e., the purified water, is discharged through the discharge unit 450 in a predetermined amount desired by a user, the controller 440 may firstly close the water outflow valve 10, as illustrated in FIG. 19.

Thus, the water that is filtered by the reverse osmosis filter 410 and flows in the purified water flow path 2, i.e., the purified water may be not introduced into the post-treatment filter 410", and may be introduced into the flushing purified water supplying flow path 5 of the flushing portion 430.

Further, the water filtered by the reverse osmosis filter 410 introducing into the flushing purified water supplying flow path 5 may flow in the flushing purified water supplying flow path 5, and may be stored in the flushing tank 431.

After the water outflow valve 10 is closed and a predetermined first set time proceeds, the controller 440 may close the water inflow valve 50, and may open the flushing valve 40 of the flushing flow path 4.

Thus, the water filtered by the reverse osmosis filter 410 stored in the flushing tank 431 of the flushing portion 430 may be introduced into the reverse osmosis filter 410, i.e., the non-filtration side portion 415 of the reverse osmosis filter 410 through the flushing purified water supplying flow path 5 and the domestic water flow path 3, as illustrated in FIG. 20.

In this case, the first set time described above may be, for example, a time at which a sufficient amount of filtered water capable of flushing the reverse osmosis filter 410 may be introduced into and stored in the flushing tank 431 of the flushing portion 430.

The first set time is not particularly limited, and may be any time as long as it is necessary to flush the reverse osmosis filter 410.

The water introduced into the non-filtration side portion 415 of the reverse osmosis filter 410 may flush the non-filtration side portion 415 of the reverse osmosis filter 410, and may be then drained externally as flushed water through the raw water flow path 1 and the flushing flow path 4, as illustrated in FIG. 20.

Further, after the water inflow valve 50 is closed, the flushing valve 40 is opened, and a predetermined second set time proceeds, for example, the controller 440 may close the flushing valve 40 to flush the reverse osmosis filter 410 for a second set time.

The second set time is not particularly limited, and may be any time as long as it is sufficient to flush the reverse osmosis filter 410.

The control method of the water purifier described above with reference to FIGS. 7 and 8 may also be applied to the water purifiers according to the second to fourth embodiments described above with reference to FIGS. 9 to 20. Although not illustrated in FIGS. 9 to 20, a flow rate sensor may be provided in the purified water flow path 2 of the water purifiers according to the second to fourth embodiments, and a discharge of a domestic water may be shut-off, or the shut-off of the discharge may be released, depending on the result of comparing an accumulated flow rate at the time of one-time extraction of the purified water calculated on the basis of a flow rate of the purified water measured by the flow rate sensor, and a predetermined flow rate value.

While exemplary embodiments have been shown and described above, it will be apparent to those skilled in the art that modifications and variations could be made without departing from the scope of the present disclosure as defined by the appended claims.

The invention claimed is:

1. A control method for a water purifier comprising:
generating purified water by filtering inflowing water;
extracting the purified water;
measuring a flow rate of the purified water extracted per unit time;
when the extraction of purified water is completed, flushing a filter unit by using the purified water generated by the filter unit; and
draining the flushed water externally through a domestic water outlet of the filter unit,
wherein the generation of purified water shuts off a discharge of domestic water generated in the generation of purified water, depending on an accumulated flow rate calculated on the basis of the flow rate of the purified water extracted per unit time while the purified water is extracted once.

2. The control method according to claim 1, wherein, in the generation of purified water, the discharge of domestic water is shut-off, when the accumulated flow rate is lower than a predetermined amount.

3. The control method according to claim 1, wherein, in the generation of purified water, the shut-off of domestic water is released to discharge the domestic water, when the accumulated flow rate is equal to or larger than a predetermined amount.

4. The control method according to claim 1, wherein the flushing the filter unit comprises:
storing purified water generated by the filter unit; and
supplying the stored purified water to a raw water inlet of the filter unit.

5. A water purifier comprising:
a filter unit configured to generate purified water by filtering water inflowing through a raw water inlet, discharge the purified water through a purified water outlet, and discharge domestic water generated during the generation of purified water through a domestic water outlet;
a flow rate sensor measuring a flow rate of purified water discharged through the purified water outlet per unit time;
a flushing portion connected to the purified water outlet and the raw water inlet, flushing the filter unit by using the purified water; and
a controller configured to extract purified water discharged through the purified water outlet according to a purified water extracting input, to flush the filter unit by providing the purified water to the flushing portion when the extraction of purified water is completed, and to shut off the discharge of domestic water depending on an accumulated flow rate calculated on the basis of the flow rate of the purified water extracted per unit time while the purified water is extracted once.

6. The water purifier according to claim 5, wherein the controller shuts off the discharge of domestic water, when the accumulated flow rate is lower than a predetermined amount.

7. The water purifier according to claim 5, wherein the controller releases the shut-off of domestic water to discharge the domestic water, when the accumulated flow rate is equal to or larger than a predetermined amount.

8. The water purifier according to claim 5, wherein the flushing portion comprises:
a flushing tank storing purified water provided from the filter unit;
a first flow path switching valve switching a flow path to provide purified water discharged through the purified water outlet to the flushing tank, when the extraction of purified water is completed; and
a second flow path switching valve switching a flow path to provide purified water stored in the flushing tank to the filter unit.

9. The water purifier according to claim 5, wherein the controller comprises:
a raw water shut-off valve shutting off water inflowing into the filter unit when the filter unit is flushed; and
a domestic water shut-off valve shutting off the discharge of the domestic water depending on the flow rate of purified water extracted per unit time discharged through the purified water outlet according to the purified water extracting input.

* * * * *